US009055505B2

(12) United States Patent
Kim et al.

(10) Patent No.: US 9,055,505 B2
(45) Date of Patent: Jun. 9, 2015

(54) METHOD AND APPARATUS IN WHICH A TERMINAL TRANSMITS A CHANNEL ESTIMATION RESULT IN A MOBILE COMMUNICATION SYSTEM

(75) Inventors: Sang-Bum Kim, Seoul (KR); Soeng-Hun Kim, Gyeonggi-do (KR); Kyeong-In Jeong, Gyeonggi-do (KR); Jung-Soo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 241 days.

(21) Appl. No.: 13/806,554

(22) PCT Filed: Jun. 17, 2011

(86) PCT No.: PCT/KR2011/004456
§ 371 (c)(1),
(2), (4) Date: Mar. 14, 2013

(87) PCT Pub. No.: WO2011/162509
PCT Pub. Date: Dec. 29, 2011

(65) Prior Publication Data
US 2013/0189990 A1    Jul. 25, 2013

(30) Foreign Application Priority Data
Jun. 22, 2010  (KR) .................. 10-2010-0059318

(51) Int. Cl.
H04W 36/00 (2009.01)
H04W 4/00 (2009.01)
H04W 36/30 (2009.01)
H04W 64/00 (2009.01)
H04W 24/10 (2009.01)
G01S 5/02 (2010.01)

(52) U.S. Cl.
CPC .............. *H04W 36/30* (2013.01); *H04W 24/10* (2013.01); *H04W 64/00* (2013.01); *G01S 5/0252* (2013.01); *H04B 17/27* (2015.01); *H04B 17/318* (2015.01); *H04B 17/382* (2015.01)

(58) Field of Classification Search
None
See application file for complete search history.

(56) References Cited

U.S. PATENT DOCUMENTS

| 7,577,206 B2 | 8/2009 | Kim |
| 2005/0266861 A1 | 12/2005 | Rajkotia |
| 2008/0232323 A1* | 9/2008 | Jeong et al. .................. 370/331 |
| 2010/0142485 A1* | 6/2010 | Lee et al. ..................... 370/331 |

OTHER PUBLICATIONS

PCT/ISA/237 Written Opinion issued on PCT/KR2011/004456 (pp. 3).
PCT/ISA/210 Search Report issued on PCT/KR2011/004456 (pp. 3).

* cited by examiner

*Primary Examiner* — Erika A Washington
(74) *Attorney, Agent, or Firm* — The Farrell Law Firm, P.C.

(57) ABSTRACT

The invention relates to a method in which a terminal transmits a channel estimation result in a mobile communication system, comprising: a step in which a receiving unit receives information required for channel estimation from a serving base station; a step in which a control unit estimates a channel on the basis of the information and generates information relating to channel estimation; and a step in which a transmitting unit transmits the information relating to channel estimation to the serving base station and at least one of a plurality of neighbor base stations.

53 Claims, 15 Drawing Sheets

METHOD AND APPARATUS IN WHICH A TERMINAL TRANSMITS A CHANNEL ESTIMATION RESULT IN A MOBILE COMMUNICATION SYSTEM

TECHNICAL FIELD

The present invention relates to measurement results-related information by a User Equipment (UE) or a terminal in a mobile communication system. More particularly, the present invention relates to a method and apparatus for transmitting measurement results to a network by a UE in a mobile communication system.

BACKGROUND ART

In general, mobile communication systems have been developed to provide communications while ensuring the mobility of users. Thanks to the rapid development of technologies, these mobile communication systems may now provide high-speed data communication services as well as the voice communications. Recently, standardization work for Long Term Evolution-Advanced (LTE-A), one of the next-generation mobile communication systems, is underway in 3rd Generation Partnership Project (3GPP). LTE-A is technology for implementing high-speed packet-based communication having a data rate higher than the currently available one and its standardization is expected to be completed in the late 2010.

In line with the evolution of the 3GPP standards, plans to easily optimize the wireless network are under discussion in addition to plans to increase the communication speed. Generally, during the initial deployment of the wireless network or during the optimization of the network, an evolved Node B (eNB) or a Radio Network Controller (RNC) needs to collect wireless environment information about its cell coverage, which is called 'drive test'.

Generally, in the existing drive test, the measurer needs to annoyingly carry out the repetitive measurement tasks for a long period of time, carrying the measurement equipment in a car. The measurement results are used to set system parameters for each eNB or RNC through an analysis process. This drive test increases the optimization cost and operation cost for the wireless network, and spends a lot of time. Therefore, research for minimizing the drive test and improving the analysis and manual settings for the wireless environment is underway in the name of Minimization of Drive Test (MDT). Operation of MDT is as follows.

In MDT, instead of actually conducting the drive test by the measurer, a UE may periodically deliver channel measurement information for a channel to an eNB while measuring the channel, or may immediately deliver channel measurement information for the channel to the eNB upon occurrence of a specific event, or may deliver channel measurement information to the eNB after a lapse of a predetermined time after storing the channel measurement information.

In the following description, an operation in which a UE transmits its channel measurement information to an eNB may be referred to as 'channel measurement information reporting' or 'MDT measurement information reporting', and these are interchangeable in terms of meaning. If the UE is communicable with the eNB, the UE may immediately transmit the channel measurement results to the eNB. Otherwise, the UE stores the channel measurement results, and reports them to the eNB if its communication with the eNB is available in the future. Then, the eNB uses the channel measurement information received from the UE, for minimization of its cell area or coverage.

On the other hand, in LTE-A, the basic MDT measurement information reporting operation is classified depending on the UE Radio Resource Control (RRC) state, as shown in Table 1 below.

TABLE 1

| RRC state of UE | MDT measurement information reporting operation of UE |
| --- | --- |
| Idle mode | logging and deferred reporting |
| Connected mode | immediate reporting |
| Connected mode | logging and deferred reporting |

In Table 1, the idle mode refers to a state in which a UE does not communicate with an eNB, and the connected mode refers to the opposite state.

Referring to Table 1, a UE in the idle mode performs 'logging and deferred reporting'. In the MDT scheme, channel information measured by the UE is transmitted by RRC signaling. The UE in the idle mode may not immediate transition to the connected mode, for transmission of the channel measurement information. Therefore, the UE in the idle mode only logs channel measurement information and defers transmission of the channel measurement information, until the UE is connected to the eNB and its state transitions to the connected mode. In other words, after the UE in the idle mode logs channel measurement information, the UE sends the channel measurement information to the eNB, if the eNB requests a report of channel measurement information from the eNB after the UE enters the connected mode.

The UE in the idle mode, that performs MDT measurement information reporting in a 'logging and deferred reporting' manner, periodically logs channel measurement information, or logs the channel measurement information when a specific event occurs. The specific event may occur, when (1) a periodical downlink pilot signal is measured (Periodical downlink pilot measurements), (2) a measured signal from a serving cell is less than or equal to a threshold (Serving Cell becomes worse than threshold), (3) a transmit power headroom is less than or equal to a threshold (Transmit power headroom becomes less than threshold), (4) a paging channel is failed (Paging Channel Failure), (5) a broadcast channel is failed (Broadcast Channel Failure), (6) a random access is failed (Random Access Failure), and (7) a radio link failure is reported (Radio link failure report).

Of the MDT measurement information that a UE transmits to an eNB, location information of the UE is an important factor. However, if a UE cannot obtain its Global Positioning System (GPS)-based location information, the UE measures a set of signal strengths received from neighboring eNBs, and reports it to the serving eNB. This set of signal strengths is referred to as 'RF fingerprint'. The serving eNB, which has received the RF fingerprint, knows location information of the neighboring eNBs in advance, and may estimate the distance between the UE and the neighboring cells by applying signal strength values of the neighboring eNBs to a signal path attenuation model. The serving eNB may estimate the approximate location of the UE by applying the location information of the neighboring eNBs and the estimated distance values between the UE and the neighboring cell, to the distance measurement scheme such as triangular distance measurement.

FIG. 1 shows a process of collecting an RF fingerprint to be used for estimation of a location of a UE, and reporting the collected RF fingerprint.

If a UE cannot obtain its GPS-based location information, the UE may transmit an RF fingerprint instead of its accurate location information, to the serving eNB. The serving eNB may estimate the location of the UE using the RF fingerprint. The RF fingerprint and the location estimation information are interchangeable in terms of meaning.

For example, in FIG. 1, a UE 105 in the idle mode, which is performing MDT measurement, collects an RF fingerprint from neighboring eNBs 115, 120 and 125, and logs the collected RF fingerprint. Thereafter, if the UE 105 enters a connected mode by being connected to a serving eNB1 110, the UE 155 in the connected mode delivers the logged RF fingerprint to a serving eNB2 160 connected to the UE 155 in the connected mode. A detailed description thereof will be made below.

The RF fingerprint is not collected only by the UE in the idle mode, but may be collected even by the UE in the connected mode and delivered to the serving eNB2 160. The UE 105 in the idle mode is assumed to camp on the cell of the serving eNB1 110.

The UE 105 collects E-UTRAN Cell Global Identifier (ECGI) information from the serving eNB1 110 in step 130. The ECGI information is a unique identifier of the cell. The UE 105 may collect a Reference Signal Received Power (RSRP) value as a value of signal strength of the serving eNB1 110. Also, the UE 105 may collect Physical Cell Identity (PCI) information and RSRP values from the neighboring eNBs 115, 120 and 125 in steps 135, 140 and 145, respectively. The PCI is an identifier indicating an associated eNB, like the ECGI.

The ECGI is a unique value to each eNB, whereas the PCI value may be reused, so a plurality of different eNBs may have the same PCI value. The ECGI is a unique identification value used to identify each of eNBs, and the identification value is large in size. So, the resource efficiency may be reduced if the ECGI value is used in every communication setup process. Therefore, eNBs may be identified by using an ECGI value in the initial communication setup, and a PCI, which is relatively small in size, in the following communication setups. The PCI value is reused because it has a relatively small size to identify all eNBs. Therefore, it is preferable that eNBs located from the distance are allocated the same PCI value if possible, so as to avoid confusion in identification of eNBs.

The UE 105 determines the exact location of a service area using the ECGI information of the serving eNB1 110, and identifies neighboring eNBs by collecting PCI values used in the area. The RF fingerprint collected in steps 130, 135, 140 and 145 may be delivered to the then-serving eNB2 160 if the UE 105 in the idle mode transitions to the connected mode in step 150. The serving eNB1 110 and the serving eNB2 160 may be either the same eNB, or different eNBs. If the two serving eNBs are different, it means that the UE 105, which was camping on the serving eNB1 110, has moved to the serving eNB2 160.

Upon request of the serving eNB2 160, the UE 155 in the connected mode may deliver the RF fingerprint together with the logged MDT measurement information in step 165. For reference, in the current LTE standard, the number of eNBs that can be included in the RF fingerprint is limited to six.

The eNBs included in the RF fingerprint may have Closed Subscriber Group (CSG) eNBs 215, 220, 225, 230 and 235 as well. Multiple CSG eNBs may exist within one macro cell area 210 since they are installed to serve or cover a relatively small area. Therefore, CSG cells are highly likely to be included in the six neighboring eNBs included in an RF fingerprint.

FIG. 2 shows the concept of CSG eNBs that can be included in an RF fingerprint.

As described in FIG. 1, a UE 205 collects PCI information and RSRP values from neighboring CSG eNBs 215, 220, 225, 230 and 235 in steps 240, 245, 250, 255 and 260, respectively. CSG eNBs may provide relatively high signal strength to a UE, since multiple CSG eNBs may be installed in a narrow area, unlike the macro-cell eNBs. Therefore, if CSG eNBs are included in an RF fingerprint, they may be usefully used as information by which a serving eNB can estimate the location of the UE. However, since multiple CSG eNBs exist within a limited area, conflicts among PCI values may occur, so there is a need to solve the conflict problem.

If communicable with an eNB, a UE may immediately transmit the MDT measurement results to the eNB. Otherwise, the UE stores the MDT measurement results, and reports them to the eNB if its communication is available in the future. Then, the eNB uses the MDT measurement information received from the UE, for coverage optimization.

In the case of MDT, since the MDT measurement information measured in a UE will be transmitted by RRC signaling, the UE may not necessarily transition to the connected mode for transmission of the information, even though it is in the idle mode. In this case, the UE only logs the MDT measurement information and defers transmission thereof to the eNB until it transitions to the connected mode. The MDT measurement information is delivered to the eNB using a control plane protocol structure for handling RRC and Non-Access Stratum (NAS) signals.

FIG. 3 shows a structure of a general control plane protocol.

RRC layers 305 and 355 are responsible for operations such as system information transmission, RRC connection control and MDT measurement control. Packet Data Convergence Protocol (PDCP) layers 310 and 350 are responsible for operations such as IP header compression/decompression, and Radio Link Control (RLC) layers 315 and 345 reconfigure PDCP Packet Data Units (PDUs) in an appropriate size, and then perform Automatic Retransmission reQuest (ARQ) operation and the like. Medium Access Control (MAC) layers 320 and 340 are connected to multiple RLC devices constructed in a single UE, and perform an operation of multiplexing RLC PDUs to a MAC PDU and demultiplexing RLC PDUs from a MAC PDU. In devices with these protocol layers, appropriate headers are added if necessary. For example, the RLC layers 315 and 345 add an RLC header including a serial number and the like to an RLC Service Data Unit (SDU), and the MAC layers 320 and 340 add a MAC header including an RLC layer identifier and the like to a MAC SDU. Physical layers 325 and 335 channel-code and modulate a MAC PDU into Orthogonal Frequency Division Multiplexing (OFDM) symbols, and transmit them over a wireless channel 330. The physical layers 325 and 335 demodulate and channel-decode OFDM symbols received over the wireless channel 330, and transfer them to their upper layers. The physical layers 325 and 335 may also perform Hybrid Automatic Retransmission reQuest (HARQ) on the MAC PDU. HARQ is a technique in which the physical layer performs retransmission and soft-combines retransmitted packets with original packets.

FIG. 4 shows the concept of Signaling Radio Bearer (SRB) mapping in an LTE system.

In FIG. 4, reference numeral 405 represents an RRC layer, reference numeral 430 represents a PDCP layer, and reference numeral 465 represents an RLC layer. As shown in FIG. 4, MDT measurement information logged by a UE is delivered from the RRC layer 405 to the PDCP layer 430 on a Signaling Radio Bearer 2 (SRB2). An RRC control message or a NAS message 410, which is delivered from the RRC layer 405 to the PDCP layer 430, is delivered on an SRB0 415, an SRB1 420 or an SRB2 425.

The SRB0 415 is used to deliver an RRC message which is sent over a Common Control Channel (CCCH) 440, and has the top priority. The SRB1 420 is used to deliver an RRC message which is sent over a Dedicated Control Channel (DCCH) 445, and may also be used to deliver some NAS messages which are sent in a piggybacked manner. The SRB2 425 is used to deliver a NAS message which is sent over a DCCH 450. Packets, which are sent on the SRB1 420 and the SRB2 425, are all encoded through integrity and ciphering processes 435 and 445. The SRB1 420 is higher in priority than the SRB2 425. MDT measurement information is delivered on the SRB2 425 having the lowest priority. In addition to the SRB0 to SRB2 415, 420, 425, there is a Data Radio Bearer (DRB) 250, which is used to transmit user plane data. A packet, which is delivered on the DRB 450, is delivered to the RLC layer 465 through a ciphering and Robust Header Compression (ROHC) process 455, and the RLC layer 465 maps the packet to a Dedicated Traffic Channel (DTCH) 460. Among the packets, which are delivered on the DRB 450 in the PDCP layer 430, PDCP PDU packets corresponding to an RLC Acknowledged Mode (AM) are delivered without loss during handover. If the PDCP layer 430 has not received yet an ACK from the RLC layer 465 with respect to PDCP SDUs which have been delivered already from the lower layer, the PDCP layer 430 is set to store the PDCP SDUs. Thereafter, the PDCP layer 430 is set to retransmit the PDCP SDUs after completion of the handover, so there may be no packet loss in a receiver. However, the packets which are delivered on the SRBs 415, 420 and 425, may be lost during handover. In the case of the SRBs 415, 420 and 425, the PDCP layer 430 does not store the PDCP SDUs which have already been delivered to the lower layer, in a handover process. Therefore, the PDCP layer 430 may not retransmit the PDCP SDUs even though the transmission is failed. This is to reduce the complexity by avoiding delivering configuration information. MDT measurement information may be lost during handover because it is delivered on the SRB2 425. In particular, the MDT measurement information is larger in capacity than the general RRC or NAS message, because it is collected by a UE for a predetermined period. Therefore, the MDT measurement information is highly likely to be lost in the handover process. In addition, since most of RRC message are related to a serving eNB, there is no big problem, even though the MDT measurement information is lost during handover for which the serving eNB is changed. However, since the MDT measurement information is deleted from a buffer of the PDCP layer after it is once reported to the serving eNB using an RRC message, the information, which is lost during the handover process, may not be recovered again.

DISCLOSURE

Technical Problem

The present invention provides a method and apparatus for configuring location estimation information by a UE in a mobile communication system.

The present invention provides a method and apparatus for including information about a CSG eNB in location estimation information in a mobile communication system.

The present invention provides a method and apparatus for collecting by a UE an RF fingerprint including CSG eNBs and delivering the collected RF fingerprint to an eNB in a mobile communication system.

The present invention provides a method and apparatus for selecting by a UE an eNB to be included in location estimation information and measuring a signal from the selected eNB in a mobile communication system.

The present invention provides a method and apparatus for selecting and logging a signal to be used for configuring location estimation information from among the measured signals from eNBs in a mobile communication system.

The present invention provides a method and apparatus for identifying a CSG eNB in a mobile communication system.

The present invention provides a method and apparatus by which a UE can overcome the receive failure which may occur during handover in a process of delivering MDT measurement information to a serving eNB.

The present invention provides a method and apparatus for solving the problems that in the case of MDT measurement information delivered on an SRB2, the MDT information cannot be retransmitted even though its transmission is failed, because a PDCP layer does not store the PDCP SDUs which have already been delivered to its lower layer, in a handover process.

The present invention provides a method and apparatus for solving the problems that MDT measurement information is lost while being delivered on an SRB2, during handover.

Technical Solution

In accordance with one aspect of the present invention, there is provided a method for transmitting channel measurement results by a User Equipment (UE) in a mobile communication system. The method includes receiving, by a receiver, information necessary for channel measurement from a serving evolved Node B (eNB); measuring, by a controller, a channel based on the received information and generating channel measurement-related information; and delivering, by a transmitter, the channel measurement-related information to the serving eNB and at least one of neighboring eNBs.

In accordance with another aspect of the present invention, there is provided an apparatus for transmitting channel measurement results by a User Equipment (UE) in a mobile communication system. The apparatus includes a receiver for receiving information necessary for channel measurement from a serving evolved Node B (eNB); a controller for measuring a channel based on the received information and generating channel measurement-related information; and a transmitter for delivering the channel measurement-related information to the serving eNB and at least one of neighboring eNBs.

In accordance with further another aspect of the present invention, there is provided a method for transmitting channel measurement results by a User Equipment (UE) in a mobile communication system. The method includes receiving information necessary for channel measurement from a serving evolved Node B (eNB); selecting at least one neighboring eNB to be included in channel measurement by the UE, using the received information; measuring a signal from the selected at least one neighboring eNB; selecting, by a controller, a signal from the eNB to be included in channel measurement by the UE based on the measured signal from the at least one neighboring eNB; generating channel-related information of the UE using the selected signal from the eNB; and transmitting the generated channel-related information of the UE to one of the at least one neighboring eNB and the serving eNB.

In accordance with yet another aspect of the present invention, there is provided an apparatus for transmitting channel measurement results by a User Equipment (UE) in a mobile communication system. The apparatus includes a receiver for receiving information necessary for channel measurement from a serving evolved Node B (eNB); a controller for selecting at least one neighboring eNB to be included in channel measurement by the UE, using the received information, measuring a signal from the selected at least one neighboring eNB, selecting a signal from the eNB to be included in channel measurement by the UE based on the measured signal from the at least one neighboring eNB, and generating channel-related information of the UE using the selected signal from the eNB; and a transmitter for transmitting the generated channel-related information of the UE to one of the at least one neighboring eNB and the serving eNB.

In accordance with still another aspect of the present invention, there is provided a method for transmitting channel measurement results by a User Equipment (UE) in a mobile communication system. The method includes receiving information necessary for channel measurement from a serving evolved Node B (eNB); generating and storing channel measurement-related information by measuring a channel from the serving eNB and at least one of neighboring eNBs, using the received information; sending a Radio Resource Control (RRC) message including the channel measurement-related information to a source eNB; receiving a handover command message from the source eNB; and determining, by a controller, whether to keep or delete the channel measurement-related information depending on whether the RRC message including the channel measurement-related information has been successfully delivered.

In accordance with still another aspect of the present invention, there is provided an apparatus for transmitting channel measurement results by a User Equipment (UE) in a mobile communication system. The apparatus includes a receiver for receiving information necessary for channel measurement from a serving evolved Node B (eNB), and receiving a handover command message from the serving eNB; a controller for generating and storing channel measurement-related information by measuring a channel from the serving eNB and at least one of neighboring eNBs, using the received information; and a transmitter for sending a Radio Resource Control (RRC) message including the channel measurement-related information. If the UE is handed over, the controller determines whether to keep or delete the channel measurement-related information depending on whether the RRC message including the channel measurement-related information has been successfully delivered.

Advantageous Effects

The present invention has the following effects.

According to the present invention, when configuring location estimation information, a UE may determine whether to include CSG eNBs, and if the UE determines to include CSG eNBs, it may identify different CSG eNBs that use the same identifier. In addition, the present invention provides a method in which a UE logs location estimation information when configuring location estimation information including CSG eNBs, thereby making it possible to increase the reliability of location estimation information configured by including CSG eNBs in the location estimation information.

The present invention may prevent data loss during a handover process.

The present invention may ensure robust data transmission during a handover process.

According to the present invention, in delivering MDT measurement results using an RRC message, a UE may reliably deliver the MDT measurement results even though handover occurs.

BEST MODE

Reference will now be made in detail to the preferred embodiments of the present invention with reference to the accompanying drawings. Wherever possible, the same reference numbers will be used throughout the drawings and the specification to refer to the same or like parts. In addition, descriptions of well-known functions and constructions are omitted for clarity and conciseness.

First and second embodiments of the present invention provide a method in which if impossible to obtain GPS-based location information, a UE reports its location information to a serving eNB by including even CSG cells like femto cells in MDT measurement information to be reported, when reporting the MDT measurement information including its location information to the serving eNB using an RF fingerprint.

In addition, third and fourth embodiments of the present invention provide a method in which in order to prevent MDT data from being lost in a process of delivering MDT measurement information to a serving eNB by a UE when performing handover in a system supporting a MDT function, an RRC layer of the UE stores MDT measurement information after transmitting the MDT data to a PDCP layer, retransmits the MDT measurement information to the PDCP layer upon receiving a transmission failure from a lower layer, and deletes all of the stored information only in the case of successful reception.

First Embodiment

The first embodiment of the present invention provides a detailed procedure in which a UE may include a signal from a neighboring CSG eNB in an RF fingerprint when configuring location estimation information.

Figure 1:
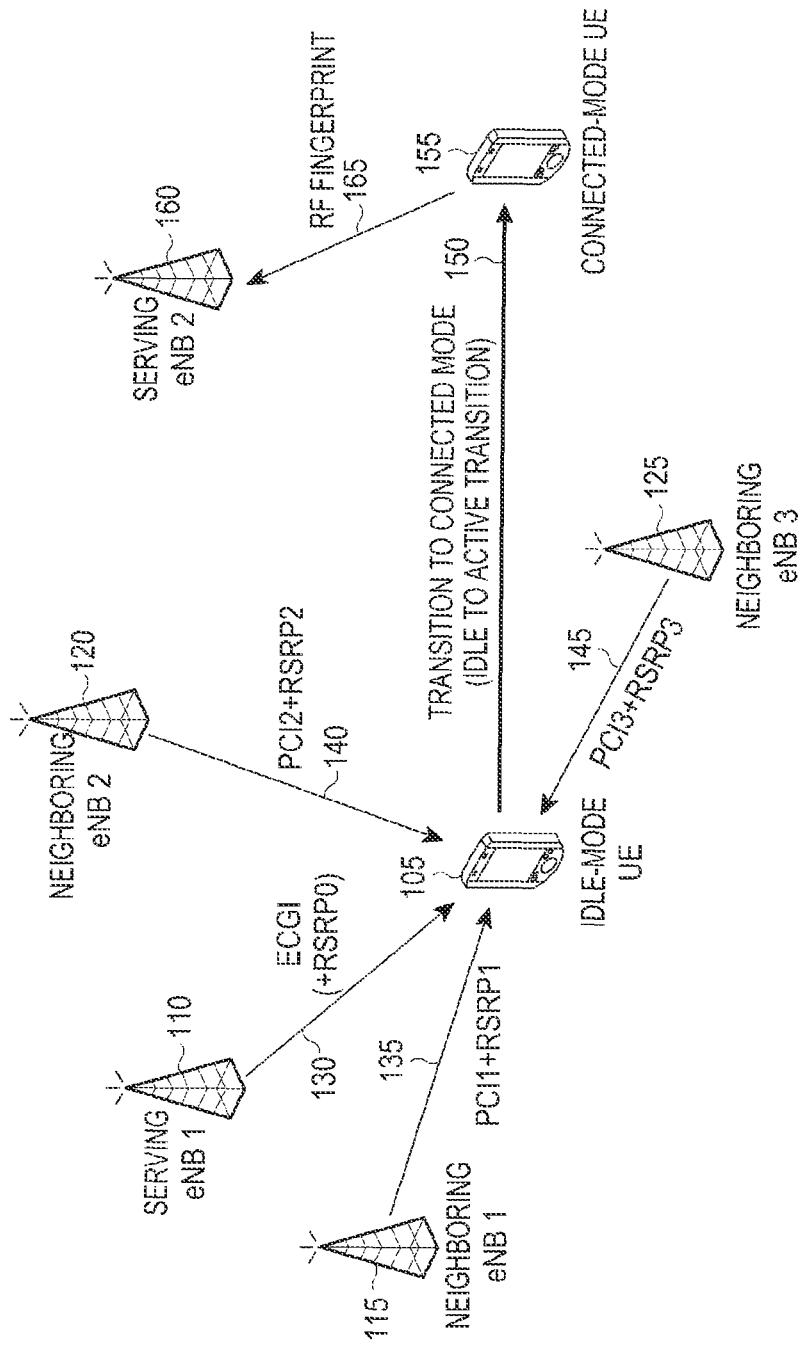
FIG. 1 shows a process of collecting an RF fingerprint to be used for estimation of a location of a UE, and reporting the collected RF fingerprint.
Figure 2:
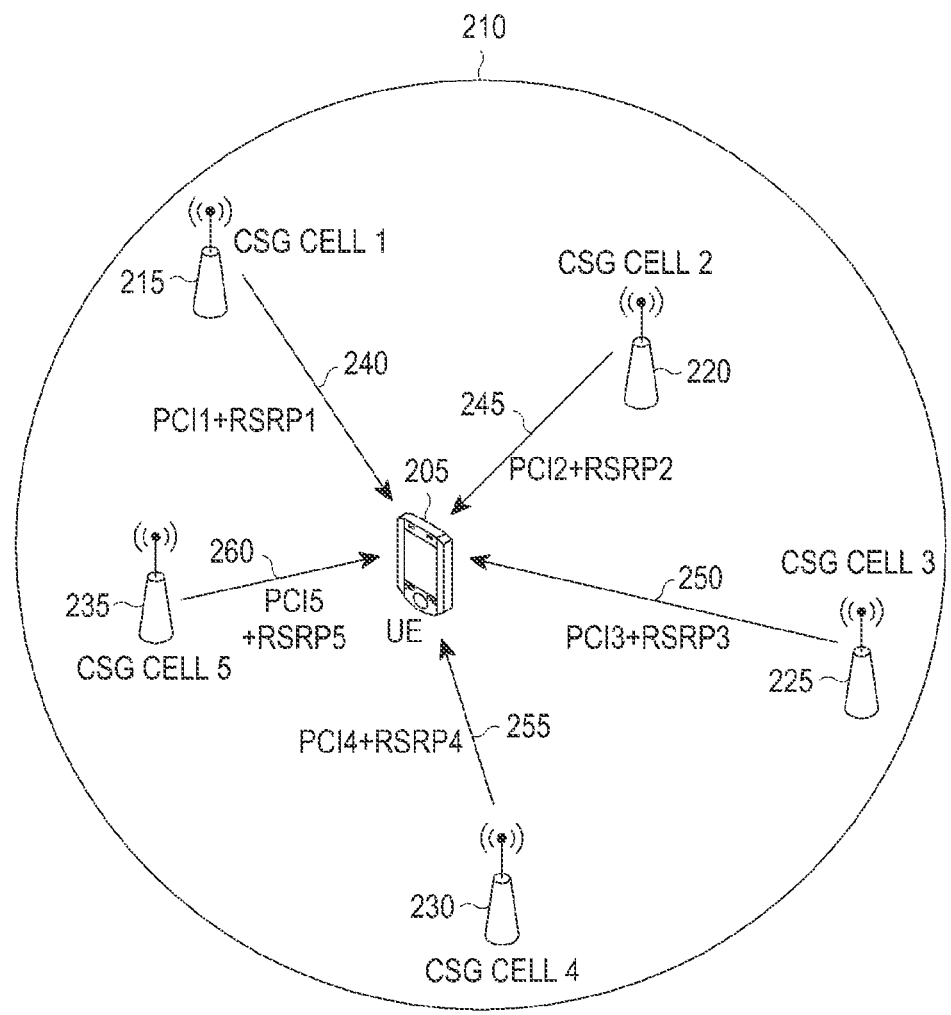
FIG. 2 shows the concept of CSG eNBs that can be included in an RF fingerprint.
Figure 3:
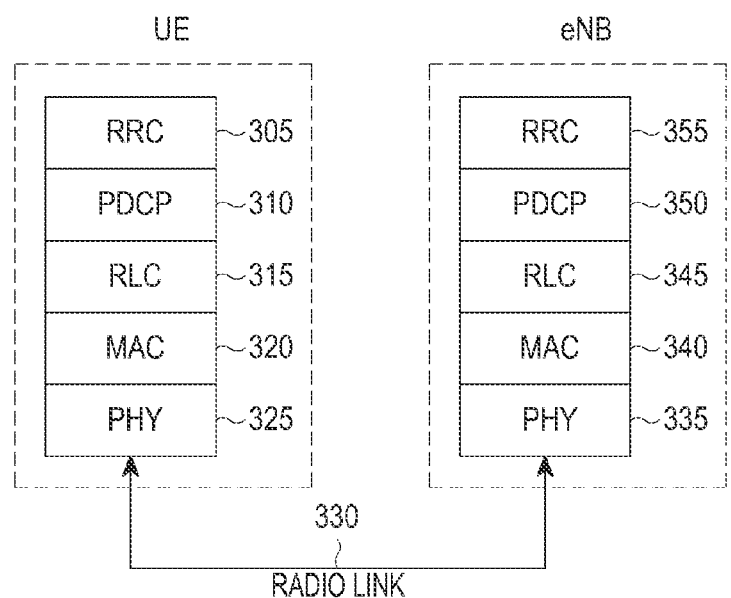
FIG. 3 shows a structure of a general control plane protocol.
Figure 4:
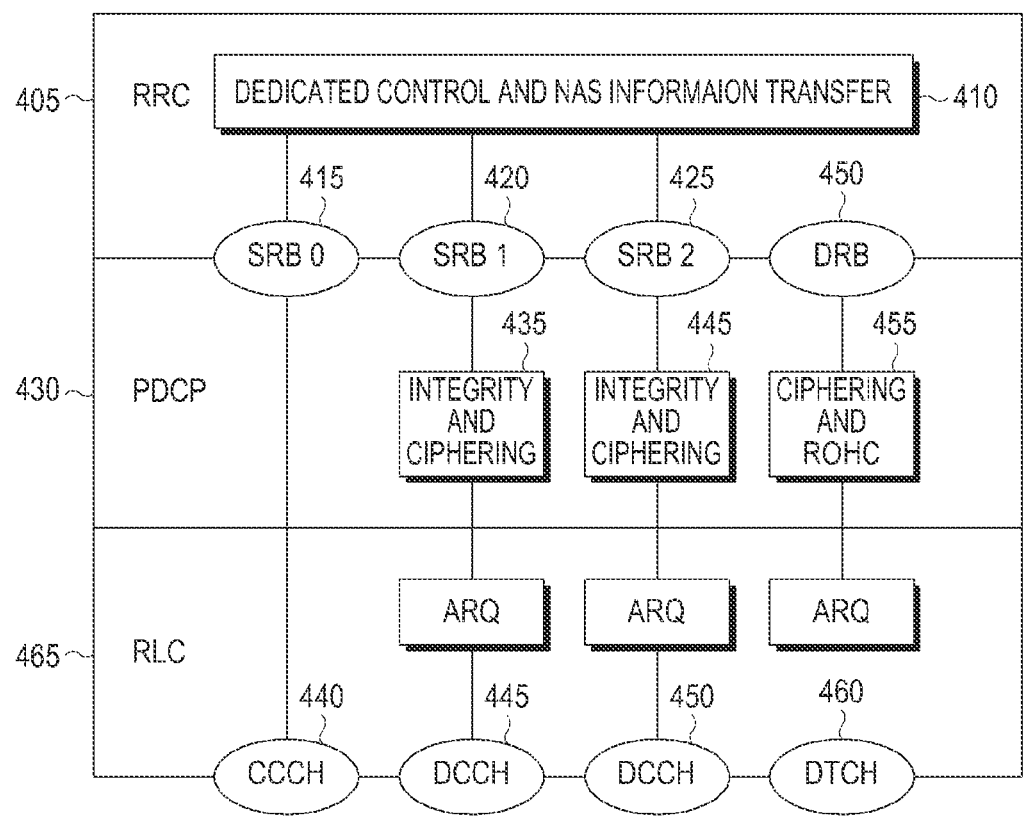
FIG. 4 shows the concept of Signaling Radio Bearer (SRB) mapping in an LTE system.
Figure 5:
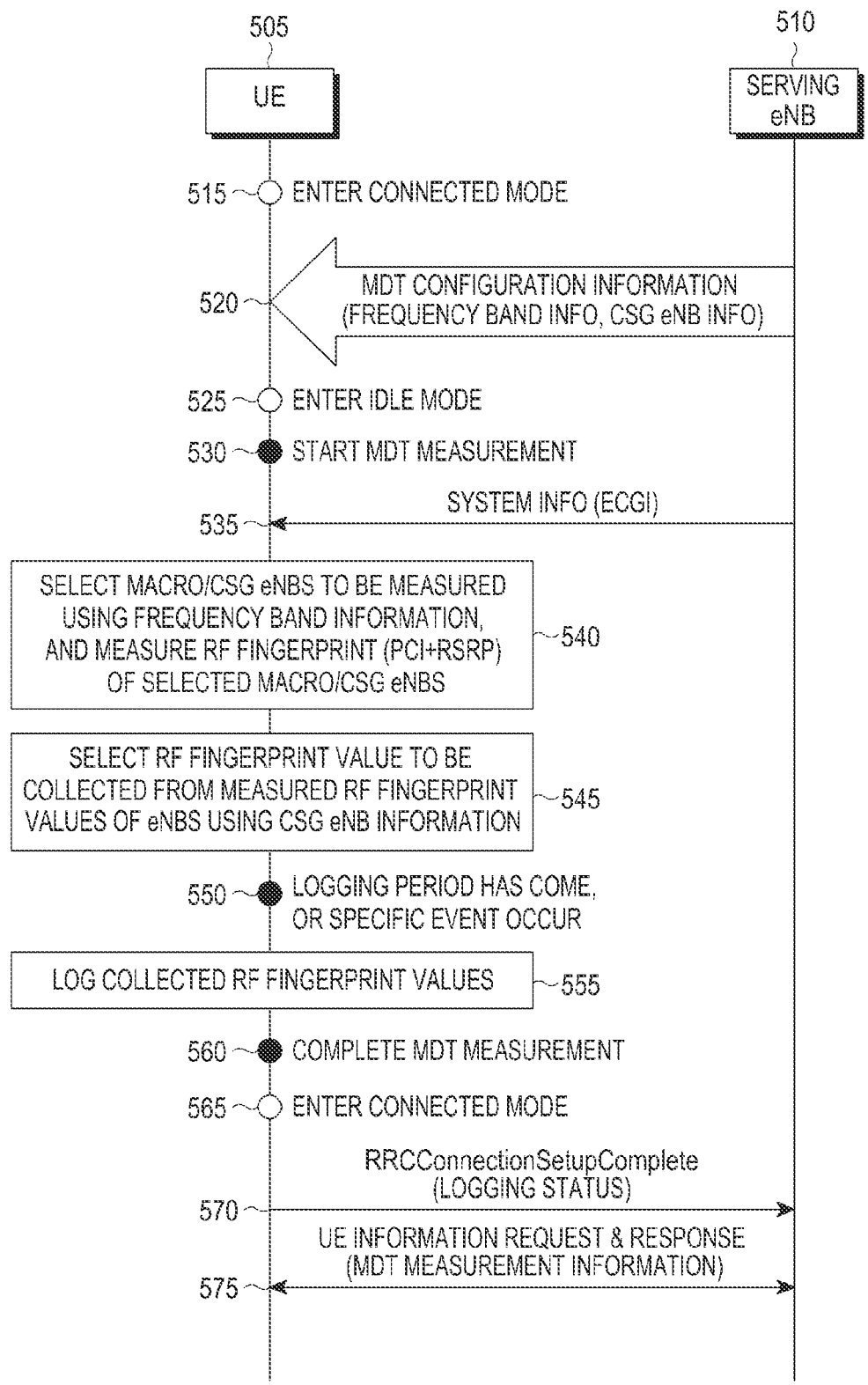
FIG. 5 shows an MDT measurement reporting scheme according to a first embodiment of the present invention.

FIG. 5 shows an MDT measurement reporting scheme according to a first embodiment of the present invention.

If a UE 505 has entered in the connected mode in step 515, a serving eNB 510 may instruct the UE 505 to perform MDT measurement reporting if necessary. The MDT measurement reporting is performed in step 520 through an MDT configuration process. In the MDT configuration process, the serving eNB 510 transmits, to the UE 505, MDT configuration information, which is the information that the UE 505 needs to measure and log an RF fingerprint.

Examples of the MDT configuration information contained in an RF fingerprint include frequency band information, which is information about a frequency band in which a UE measures a signal during measurement, and CSG eNB information indicating whether to include CSG eNBs during collection of an RF fingerprint.

For the measurement of RF fingerprint information, the UE 505 measures signals from eNBs that use the frequency band indicated by the frequency band information included in the MDT configuration information, among the signals from neighboring eNBs. The frequency band information may include frequency information about a macro eNB and/or frequency information about a CSG eNB(s).

As an example of the frequency band information, the frequency band information may indicate the same frequency band as the frequency band of the serving eNB. The radio environments that a signal experiences, which is transmitted and received in the same frequency band, are similar to each other. Therefore, the RF fingerprint information configured by being measured from signals in the same frequency band may enable the serving eNB to more accurately estimate the location of the UE. However, the frequency band information is not limited to the same frequency band as the frequency band of the serving eNB, but may indicate a frequency band different therefrom, or indicate multiple frequency bands.

The frequency band information should not necessarily be included in the MDT configuration information. If frequency band information was provided to a UE as described above, the UE measures signals from macro/CSG eNBs that use the frequency band indicated by the frequency band information. On the other hand, if the frequency band information was not provided to a UE, the UE may select eNBs depending on the predetermined settings, or determine eNBs at random. For example, depending on the predetermined settings, the UE may select neighboring eNBs that use the same frequency band as the frequency band used by the serving eNB, or the UE may select eNBs that provide the highest signal strength, regardless of the frequency band.

The reason for providing CSG eNB information is because as described above, CSG eNBs may also be included during collection of an RF fingerprint. In other words, the CSG eNB information is information indicating whether to include signals from CSG eNBs when the UE 505 determines eNBs to be included in RF fingerprint information based on a scheme of using frequency band information, measures signals from the determined eNBs, and then configures RF fingerprint information by selecting some of the measured signals from the eNBs. However, depending on the system configuration, the UE 505 may not include the CSG eNB information in the MDT configuration information. In this case, the UE 505 may include CSG eNBs during collection of the RF fingerprint at all times.

It is assumed in step 525 that the UE 505 has transitioned to the idle mode. In step 530, the UE 505 starts MDT measurement. In step 535, the serving eNB 510 broadcasts system information, which includes ECGI information which is a unique identifier of the eNB. The UE 505 obtains ECGI information of its serving eNB 510 based on the broadcasted system information. For reference, the system information may be classified depending on the type of the information included in the system information, and the system information including the ECGI information is included in a System Information Block Type1 (SIB1). As for the ECGI information included in the SIB1, the UE 505 may not check the ECGI information unless it decodes even a Physical Downlink Shared Channel (PDSCH).

In step 540, the UE 505 measures an RF fingerprint for macro/CSG eNBs that use the frequency band depending on the frequency information of the neighboring eNBs, i.e., measures PCIs and RSRPs of the eNBs. As described above, the PCI, an eNB identification value, may be reused in different eNBs. Therefore, it is preferable that eNBs located from the distance use the same PCI, so as to avoid PCI conflicts among different eNBs.

In step 545, the UE 505 selects the macro/CSG eNBs to be included during collection of an RF fingerprint, from the measured RF fingerprint values of eNBs based on the CSG eNB information. In other words, if the CSG eNB information is an indicator indicating inclusion of CSG eNBs, the UE 505 includes the CSG eNBs during collection of the RF fingerprint. Otherwise, the UE 505 excludes the CSG eNBs.

If a logging period of MDT measurement information has come or a specific event for logging occurs in step 550, the UE 505 logs the RF fingerprint values of eNBs, which were measured in step 540, for the selected macro/CSG eNBs in step 555. Thereafter, the UE 505 ends the MDT measurement process in step 560.

Thereafter, if the UE 505 has entered the connected mode in step 565, the UE 505 informs the serving eNB 510 whether there is MDT logging information to report, using an RRC-ConnectionSetupComplete message in step 570. This serving eNB may be different from the serving eNB that was used when the UE 505 actually logs MDT measurement information. The serving eNB 510 obtains MDT measurement information using UE Information request and response messages in step 575, if it requires logged MDT measurement information.

Figure 6:
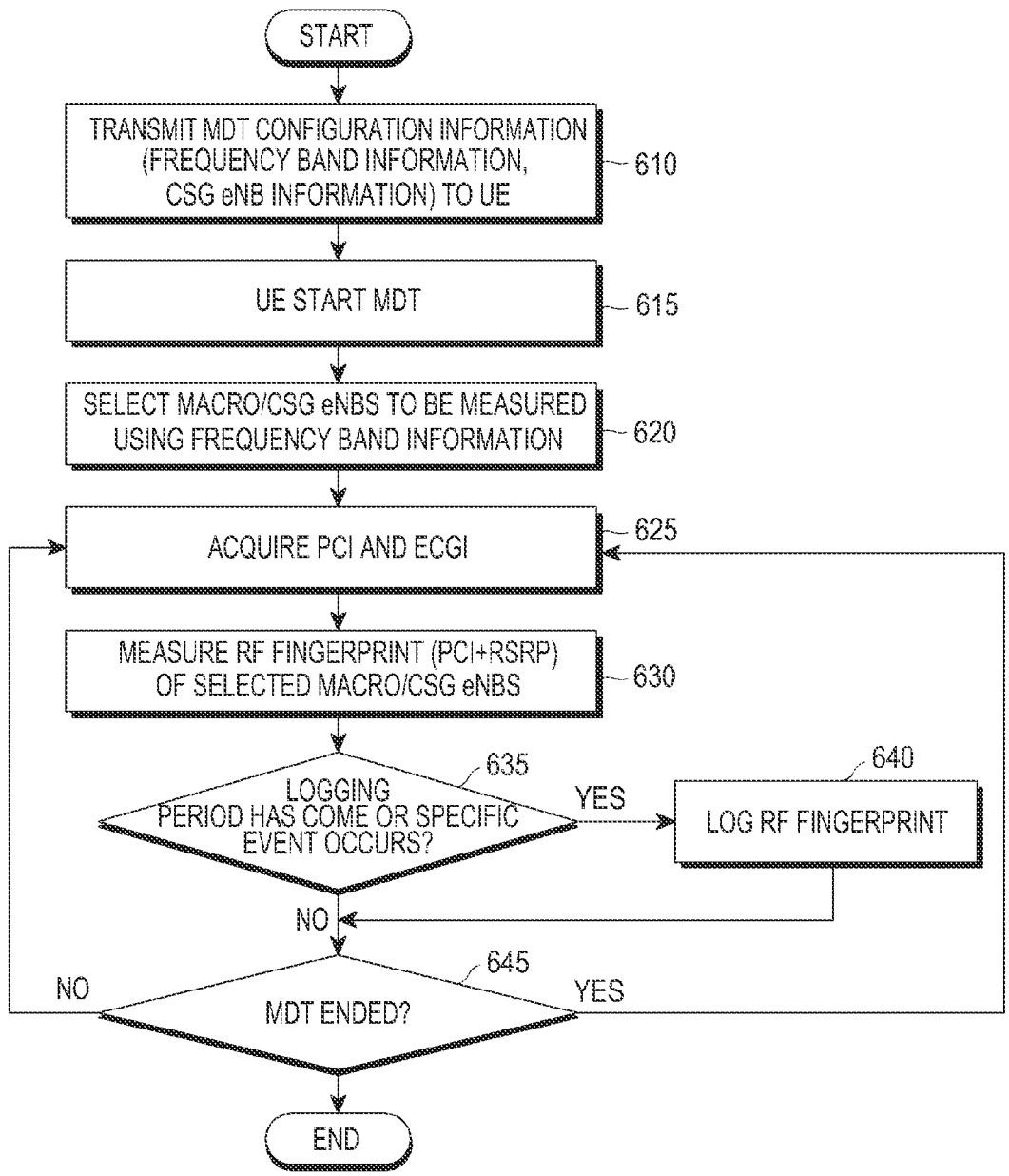
FIG. 6 shows a method of logging an RF fingerprint according to the first embodiment of the present invention.

FIG. 6 shows a method of logging an RF fingerprint according to the first embodiment of the present invention.

In step 610, an eNB transmits MDT configuration information to a UE. The MDT configuration information includes information necessary for performing MDT. Examples of the MDT configuration information contained in an RF fingerprint include frequency band information, which is information about a frequency band in which a UE measures a signal during measurement, and CSG eNB information indicating whether to include CSG eNBs during collection of an RF fingerprint.

In step 615, the UE performs MDT at a predetermined time, for example, when it transitions from the connected mode to the idle mode. If the frequency band information indicates specific frequency bands, the UE may measure signals only from the eNBs that use the specific frequency bands. On the other hand, if the frequency band information is not included in the MDT configuration information or the frequency band information does not indicate specific frequency bands, the UE may determine eNBs for RF fingerprint measurement regardless of the specific frequency bands, or may determine eNBs that use the same frequency band as the frequency band of the serving eNB, as eNBs for RF fingerprint measurement, in step 620.

In step 625, the UE obtains ECGI information used by the serving eNB, and PCI information used by neighboring cell eNBs. For reference, to obtain the ECGI information, the UE needs to decode a PDSCH. On the other hand, in order to obtain the PCI information, the UE only needs to decode Primary Synchronization Signal (PSS) and Secondary Synchronization Signal (SSS) channels used for synchronization acquisition. The ECGI and PCI acquisition process will be described in detail with reference to FIG. 7. Based on the acquired PCI information, the UE may determine whether the neighboring eNBs are macro eNBs or CSG eNBs. This is because the PCI values are classified into PCI values for macro eNBs and PCI values for CSG eNBs.

In step 630, the UE determines eNBs to be included in RF fingerprint measurement according to the predetermined scheme, and measures signal strengths such as RSRP. The predetermined scheme refers to a scheme of selecting eNBs that use the frequency indicated by the frequency band information, or a scheme of determining eNBs depending on predetermined settings.

If a logging period has come or a specific event occurs in step 635, the UE logs the RF fingerprint information, which was measured in step 630, in step 640. If the logging period has not come or the specific event does not occur in step 635, the UE determines in step 645 whether MDT is ended. If not ended yet, the UE returns to step 625.

Figure 7:
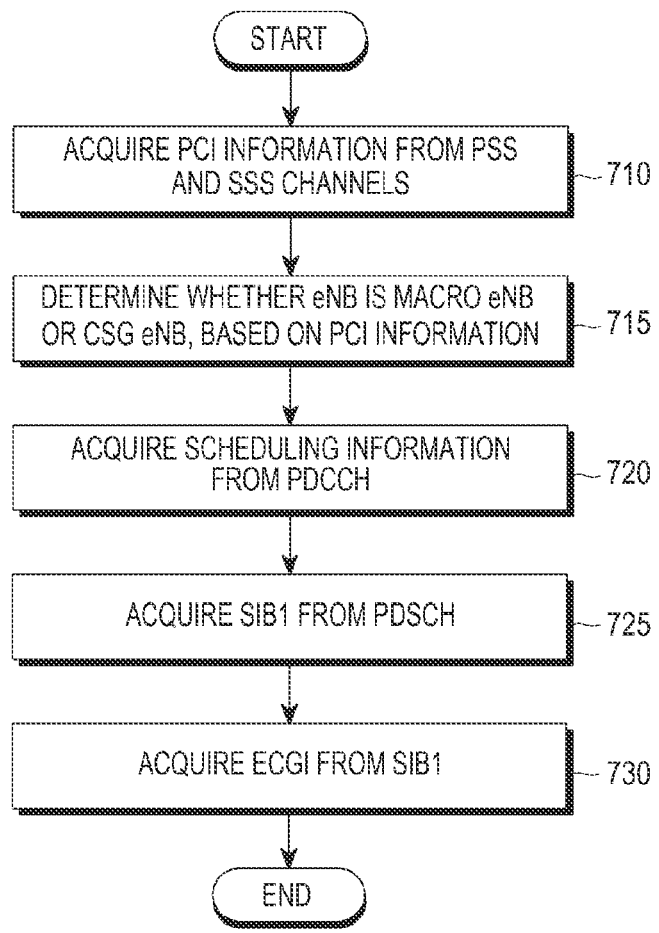
FIG. 7 shows a method of acquiring an ECGI and a PCI in step 625 of FIG. 6.

FIG. 7 shows a method of acquiring an ECGI and a PCI in step 625 of FIG. 6.

In step 710, a UE acquires PCI information used by an eNB while acquiring synchronization using PSS and SSS channels transmitted from the eNB. As for the PCI information, there are a total of 504 different pieces of PCI information, and the PCI information is used to identify eNBs. Among the PCIs, some are used for identifying macro eNBs and the others are used for identifying CSG eNBs. Therefore, in step 715, the UE determines whether the eNB is a macro eNB or a CSG eNB, based on the acquired PCI information.

Having acquired synchronization, the UE may decode a Physical Broadcast Channel (PBCH) and a Physical Downlink Control Channel (PDCCH) in sequence. The PBCH includes information about a system frame number and a frequency band. The PDCCH includes position information of time and frequency resources allocated for transmission of system information on a PDSCH, i.e., includes scheduling information for system information. The system information is divided into different types depending on the type of the included information, and each type of system information has different transmission timing. Of the system information types, the SIB1 includes ECGI information, which is repeatedly transmitted every 20 ms. Therefore, the UE acquires scheduling information for the system information from the PDCCH in step 720, and acquires SIB1 using the scheduling information in step 725. In step 730, the UE acquires ECGI information included in the SIB1.

Figure 8:
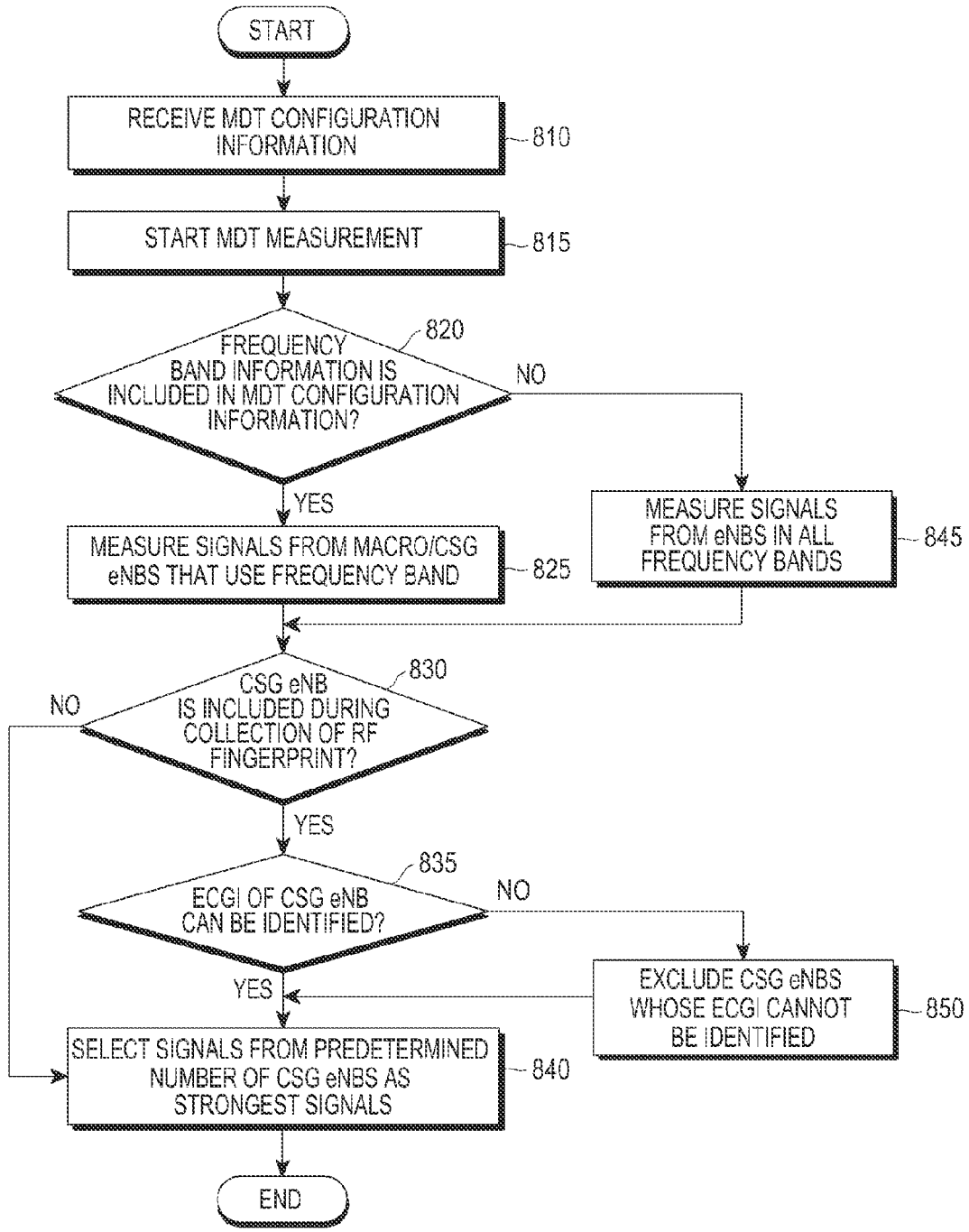
FIG. 8 shows an operation of selecting eNBs to be included during collection of an RF fingerprint according to the first embodiment of the present invention.

FIG. 8 shows an operation of selecting eNBs to be included during collection of an RF fingerprint according to the first embodiment of the present invention.

It is assumed in step 810 that a UE is in the connected mode. The UE receives MDT configuration information from an eNB. The MDT configuration information includes information necessary for measurement, collection and logging of RF fingerprint information. In other words, the MDT configuration information includes frequency band information for RF fingerprint measurement, and CSG eNB information indicating whether to include CSG eNBs during collection of an RF fingerprint.

If the UE performs MDT in step 815, the UE determines in step 820 whether the MDT configuration information includes frequency band information of the eNB. If the frequency band information is included, the UE measures signals from macro/CSG eNBs that use the frequency band, in step 825.

In step 830, the UE determines whether CSG eNBs are included during collection of an RF fingerprint. Whether CSG eNBs are included may be determined depending on whether CSG eNB information is included in the MDT configuration information. As another method, whether CSG eNBs are included may be determined depending on predetermined settings.

If it is determined in step 830 that CSG eNBs are included, the UE determines in step 835 whether it is possible to identify an ECGI of CSG eNBs. If it is possible to identify an ECGI of CSG eNBs in step 835, the UE selects a predetermined number of strongest signals from among the measured signals from macro/CSG eNBs and includes them in an RF fingerprint, in step 840. However, if it is not possible to identify an ECGI of CSG eNBs in step 835, the UE excludes the CSG eNBs, an ECGI of which cannot be identified, from the RF fingerprint, and then proceeds to step 840. The meaning of steps 835, 840 and 850 will be described in detail below.

Generally, CSG eNBs may provide relatively high signal strength to a UE because multiple CSG eNBs may be installed in a narrow area. However, conflicts among PCI values may occur between different CSG eNBs, since multiple CSG eNBs may exist within a limited area. If these conflicts occur, the UE may not exactly identify CSG eNBs.

Because an ECGI is a unique identifier of an eNB as described above, if a UE may not acquire an ECGI value of CSG eNBs, the UE may not identify different CSG eNBs. Therefore, if CSG eNBs are included during collection of an RF fingerprint, the UE checks an ECGI of CSG eNBs to distinguish different CSG eNBs in step 835. For reference, a PDSCH needs to be decoded, since the ECGI is included in a SIB1 which is system information transmitted by CSG eNBs. Therefore, the UE may not check the ECGI unless the strength of signals from the CSG eNBs is strong enough to decode the PDSCH.

Also, as described with reference to FIG. 7, the UE may acquire a PCI if it successfully receives only synchronization channels of a PSS and an SSS. However, the UE may acquire an ECGI from a SIB1 in a PDSCH after acquiring scheduling information from a PDCCH. Therefore, if the UE has successfully acquired a PCI, but has not successfully acquired an ECGI, the UE may determine that the eNB is a CSG eNB. However, if different CSG eNBs use the same PCI, the UE may not identify these CSG eNBs. Therefore, CSG eNBs, an ECGI of which cannot be identified, need to be excluded from the eNBs to be included in the RF fingerprint.

For these reasons, if the UE cannot identify an ECGI of CSG eNBs in step 835, the UE excludes the CSG eNBs from the RF fingerprint in step 850. After step 850, the UE selects a predetermined number of strongest signals from eNBs in step 840. Signals from the CSG eNBs, which are already excluded in step 850, will not be included in the selected signals from eNBs.

On the other hand, if an ECGI of CSG eNBs can be identified in step 835, the UE selects a predetermined number of eNBs in the order of the strongest signal, from among neighboring macro eNBs and CSG eNBs, an ECGI of which was identified, in step 840. For reference, in the current LTE standard, the number of eNBs to be included in an RF fingerprint is limited to six. However, the number of eNBs is subject to change depending on the system settings.

On the other hand, if frequency band information is not included in the MDT configuration information in step 820, the UE measures signals from neighboring eNBs in all frequency bands in step 845, and then proceeds to step 830. Alternatively, the UE measures neighboring eNBs that use specific frequency bands, in accordance with the predetermined agreement. For example, the UE may measure neighboring eNBs that use the same frequency band as the frequency band used by the serving eNB.

The UE proceeds to step 840, even if it is determined in step 830 that CSG eNBs are not included during collection of an RF fingerprint. Herein however, the UE will select a predetermined number of eNBs from macro eNBs in the order of the strongest signal, since CSG eNBs are not included.

Figure 9:
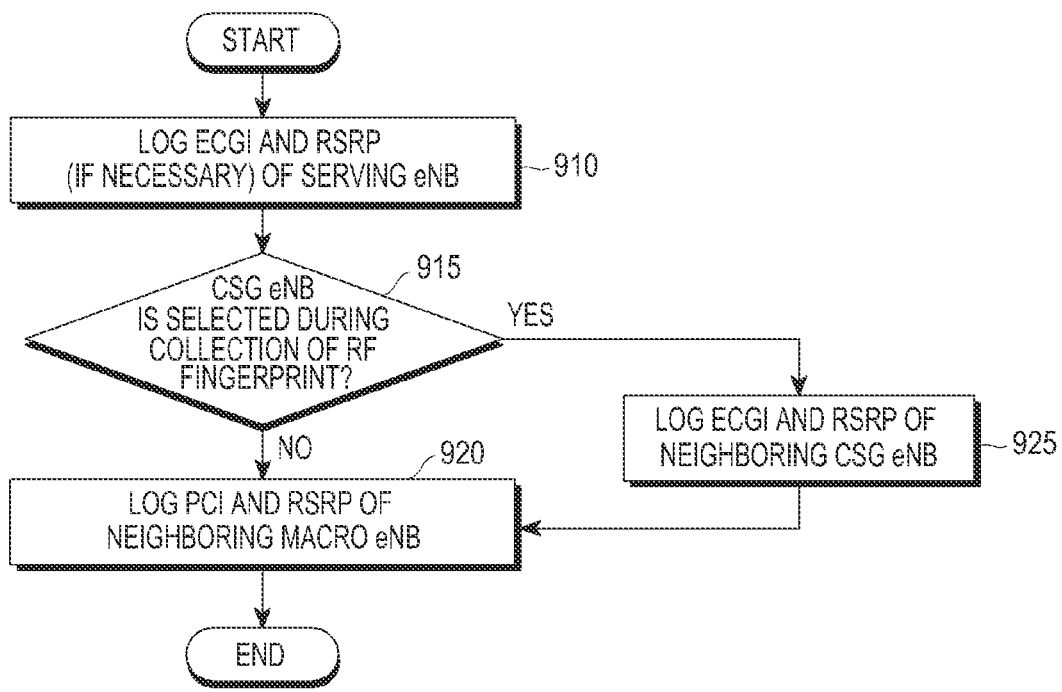
FIG. 9 shows an operation of logging an RF fingerprint according to the first embodiment of the present invention.

FIG. 9 shows an operation of logging an RF fingerprint according to the first embodiment of the present invention.

It is assumed in FIG. 9 that before logging an RF fingerprint, a UE has already completed selection of macro/CSG eNBs to be included in the RF fingerprint.

In step 910, the UE logs ECGI and RSRP values of a serving eNB as a part of the RF fingerprint. However, the RSRP value may be logged only when necessary. In step 915, the UE determines whether CSG eNBs are included among the selected eNBs. If CSG eNBs are not included, the UE logs PCI and RSRP values of neighboring macro-cell eNBs in step 920. Otherwise, the UE logs ECGI and RSRP values for the selected CSG eNBs in step 925.

Second Embodiment

The second embodiment of the present invention provides a method in which an eNB informs a UE whether PCI confusion of CSG eNBs has occurred, and based thereon, the UE determines whether to include CSG eNBs in an RF fingerprint.

The expression 'there is PCI confusion for CSG eNBs' means that it is not possible to determine the location where a CSG eNB exists, only with the PCI of the CSG eNB. The expression 'there is no PCI confusion of CSG cells' means that it is possible to determine the location of a CSG eNB, only with the PCI of the CSG eNB.

In the present invention, after camping on an arbitrary CSG eNB, a UE includes the CSG eNB in an RF fingerprint if there is no PCI confusion in the CSG eNB, and excludes the CSG eNB from the RF fingerprint if there is PCI confusion in the CSG eNB.

Figure 10:
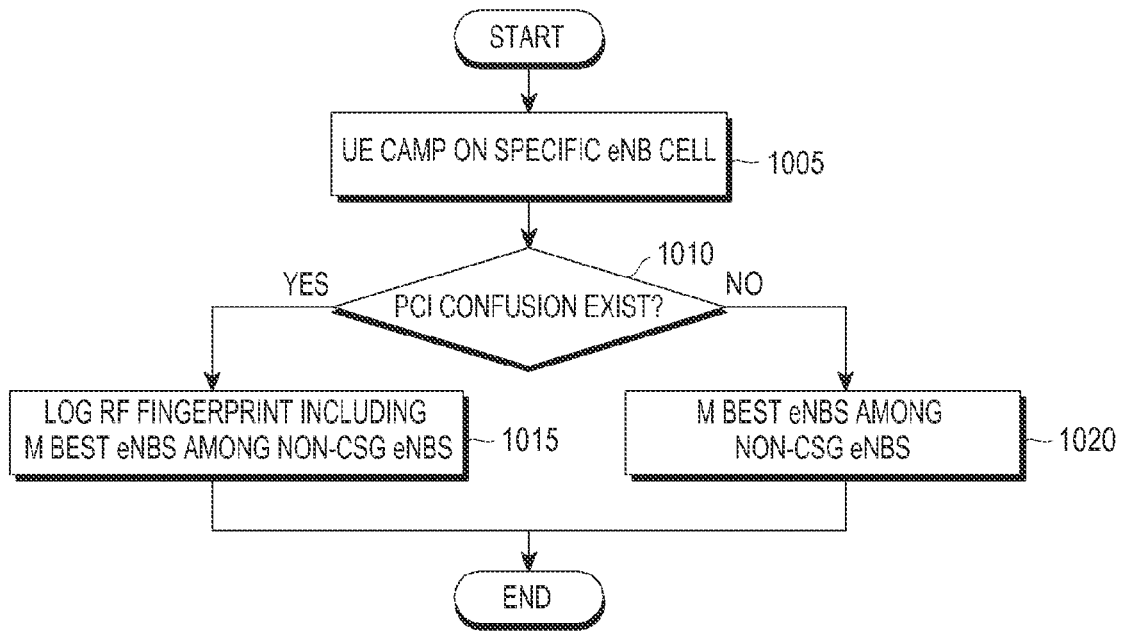
FIG. 10 shows an operation according to a second embodiment of the present invention.

FIG. 10 shows an operation according to a second embodiment of the present invention.

It is determined in step 1005 that a UE camps on an arbitrary CSG eNB. In step 1010, the UE determines whether there is PCI confusion in the CSG eNB.

As an example, in step 1010, the UE may receive system information of the CSG eNB and determine whether a PCI confusion indicator is included in the system information. In other words, the UE may determine that there is PCI confusion, if there is a PCI confusion indicator in the received system information, and may determine that there is no PCI confusion, if there is no PCI confusion indicator in the received system information.

As another example, in step 1010, if there is no PCI confusion in an eNB, the eNB transmits a PCI safety indicator to a UE, and the UE may determine that there is PCI confusion, if it has failed to receive the PCI safety indicator, but may determine that there is no PCI confusion, if it has received the PCI safety indicator.

The UE proceeds to step 1015 if it is determined in step 1010 that there is PCI confusion, but proceeds to step 1020 if it is determined that there is no PCI confusion.

In step 1015, at the time the UE needs to log an RF fingerprint, the UE logs predetermined measurement results (e.g., measurement values such as PCI and pilot channel received strengths of the cells having the highest pilot channel received strengths) among the eNBs from which CSG eNB are excluded in the frequency band specified for the RF fingerprint. For example, the UE determines whether an eNB is a CSG eNB, in the order of the highest signal strength, and does not include the eNB in the RF fingerprint if the eNB is a CSG eNB, but excludes the eNB from the RF fingerprint if the eNB is not a CSG eNB, and the UE may repeat this operation until information about a predetermined number of eNBs is logged in the RF fingerprint.

In order to determine whether an arbitrary eNB is a CSG eNB, the UE needs to know PCIs of which area are used by CSG eNBs. The above information may be provided through the system information of the eNB, and the UE logs a predetermined number of eNBs providing the strongest signals in the RF fingerprint since the UE cannot determine which eNB is a CSG eNB until it obtains the information. However, the UE excludes eNBs belonging to a PCI area of a CSG cell from the RF fingerprint beginning from the time the UE acquired information about the PCI area of the CSG eNB.

In step 1020, the UE includes eNBs having good measurement results such as high pilot channel received strengths in the RF fingerprint regardless of whether the eNB is a CSG eNB.

The operation of a UE, described with reference to FIG. 10, may be modified if PCI confusion exists in all eNBs at all times. In this case, an eNB does not broadcast information indicating PCI confusion, and when the UE camps on an arbitrary eNB, the UE does not include cells belonging to a PCI area of a CSG eNB in the RF fingerprint if the eNB recognizes the PCI area of the CSG eNB, but includes eNBs in the RF fingerprint in the order of good measurement results regardless of whether the eNB is a CSG eNB, if the UE cannot acquire information about the PCI area of the CSG eNB.

Figure 11:
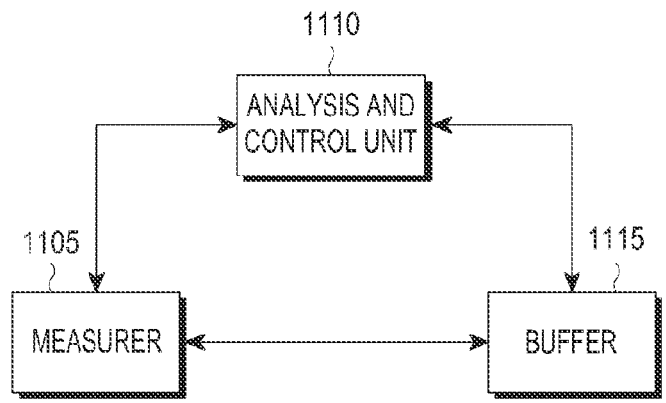
FIG. 11 shows an apparatus for logging RF fingerprint information by a UE according to an embodiment of the present invention.

FIG. 11 shows an apparatus for logging RF fingerprint information by a UE according to an embodiment of the present invention.

A measurer 1105 measures signals from a serving eNB, a neighboring macro eNB, and neighboring CSG eNBs. In the connected mode, the measurer 1105 receives MDT configuration information transmitted by the serving eNB.

An analysis and control unit 1110 analyzes frequency band information for RF fingerprint measurement and CSG eNB information for RF fingerprint measurement by analyzing the MDT configuration information received from the serving eNB, and performs an operation based thereon. In other words, the analysis and control unit 1110 determines eNBs that use the frequency band indicated by the frequency band information, among the neighboring eNBs, and controls the measurer 1105 to measure signals from the determined eNBs.

The analysis and control unit 1110 obtains PCI information through a PSS and an SSS received from each eNB, and acquires ECGI information through a PDCCH and a PDSCH. Also, the analysis and control unit 1110 selects eNBs to be included during collection of an RF fingerprint from among the measured eNBs, considering signal strengths from neighboring eNBs, CSG eNB information, and whether an ECGI of CSG eNBs is acquired, and logs signal measurement information for the selected eNBs in the RF fingerprint.

The analysis and control unit 1110 logs an ECGI of the serving eNB and CSG eNBs as RF fingerprint information, during RF fingerprint logging. The RF fingerprint information logged by the analysis and control unit 1110 is stored in a buffer 1115.

The present invention relates to a retransmission method and apparatus in an RRC layer for supporting an MDT function of a mobile communication system. The present invention provides a UE operation in which a UE overcomes the receive failure which may occur during handover in a process of delivering MDT measurement information to a serving eNB.

In the case of MDT measurement information delivered on an SRB2, a PDCP layer may not retransmit the MDT measurement information even though its transmission is failed because the PDCP layer does not store the PDCP SDUs which have already been delivered to its lower layer, in a handover process. Therefore, in the present invention, an RRC layer of a UE separately processes an RRC message including MDT measurement information and a general RRC message. More specifically, an RRC message which was sent by a previous eNB no longer has its utility value if handover occurs, because an RRC message is generally used by an eNB and a UE to exchange control information. Therefore, in the case of a general RRC message, the RRC layer does not retransmit the RRC message even though a handover occurs before its transmission is completed. The RRC layer discards an RRC message immediately after sending it to the lower layer, because the lower layer ensures the reliable transmission unless a handover occurs. On the other hand, in the case of an RRC message associated with MDT measurement results, the RRC message still has its utility value even though a handover occurs, because the device that will finally use the MDT measurement results is not an eNB but a server located in the core network. Therefore, for the RRC message associated with MDT measurement results, its transmission needs to be completed even if a handover occurs. To this end, the present invention distinguish between a general RRC message and an RRC message including MDT measurement results, and while the general RRC message is transmitted depending only on the transmission reliability guarantee scheme provided by the lower layer, the RRC message including MDT measurement results is transmitted depending not only on the transmission reliability guarantee scheme provided by the lower layer, but also on a new transmission reliability guarantee scheme. The 'transmission reliability guarantee scheme provided by the lower layer' refers to a scheme in which an RLC layer transmits/receives data without a loss through an ARQ operation. The ARQ operation in the RLC layer has the feature of no longer guaranteeing the reliability if a handover occurs. The new transmission reliability guarantee scheme to be applied to the RRC message including MDT measurement results is as follows.

First, a layer device (e.g., an RRC) for sending the RRC message including MDT measurement results stores the RRC message including MDT measurement results without discarding it even after sending the RRC message to its lower layer, in order to send it to the opposing RRC layer device. For reference, the general RRC message is discarded right after it is delivered to the lower layer. The RRC discards the RRC message if the lower layer notifies that it has successfully sent the RRC message including MDT measurement results. On the other hand, if a handover occurs before the lower layer notifies that it has successfully sent the RRC message, the RRC retransmits the RRC message after the handover is completed, because there is a high possibility that the lower layer has failed to send the RRC message and the lower layer will not retransmit the RRC message after the handover is completed. In other words, after the handover is completed, the RRC notifies the eNB of the presence of an MDT measurement result report, and if the eNB instructs MDT measurement reporting, the RRC retransmits the stored RRC message. Of course, because what should be retransmitted is not the RRC message including an MDT measurement result report, but the MDT measurement result report itself, the RRC (or a device responsible for MDT measurement reporting) of the UE discards the RRC message including MDT measurement results as soon as it delivers the RRC message to the lower layer, but the RRC may store the MDT measurement results until the RRC message including MDT measurement results is successfully transmitted.

In summary, a UE operation proposed by the present invention is as follows. The UE stores an RRC message including MDT measurement results until a predetermined first event occurs, discards the RRC message if the predetermined first event occurs, and retransmits the RRC message to an eNB if a predetermined second event occurs before the first event occurs. The first event corresponds to receiving from the lower layer a notification indicating the successful transmission of the RRC message. The lower layer may notify the RRC layer of the successful transmission of the RRC message, if it receives an ACK for RLC PDUs after transmitting the RLC PDUs including the RRC message. The second event corresponds to a handover. In other words, the UE initiates a procedure for retransmitting the RRC message after the handover is completed, if a handover occurs before the lower layer notifies that the stored RRC message has been successfully transmitted.

The present invention may be modified as follows. If a UE delivers an RRC message including MDT measurement results to a lower layer, the UE stores the MDT measurement results until a predetermined first event occurs. The UE discards the MDT measurement results if the first event occurs, and initiates a procedure for retransmitting the MDT measurement if a second event occurs before the first event occurs. This is the same meaning as initiating a procedure for transmitting the MDT measurement results to an eNB after the handover is completed. The procedure for transmitting the MDT measurement results to an eNB refers to a procedure, in which a UE notifies an eNB of the existence of MDT measurement results, and if the eNB commands the UE to transmit the MDT measurement results, the UE configures a predetermined RRC message with the MDT measurement results and transmits it to the eNB.

Figure 12:
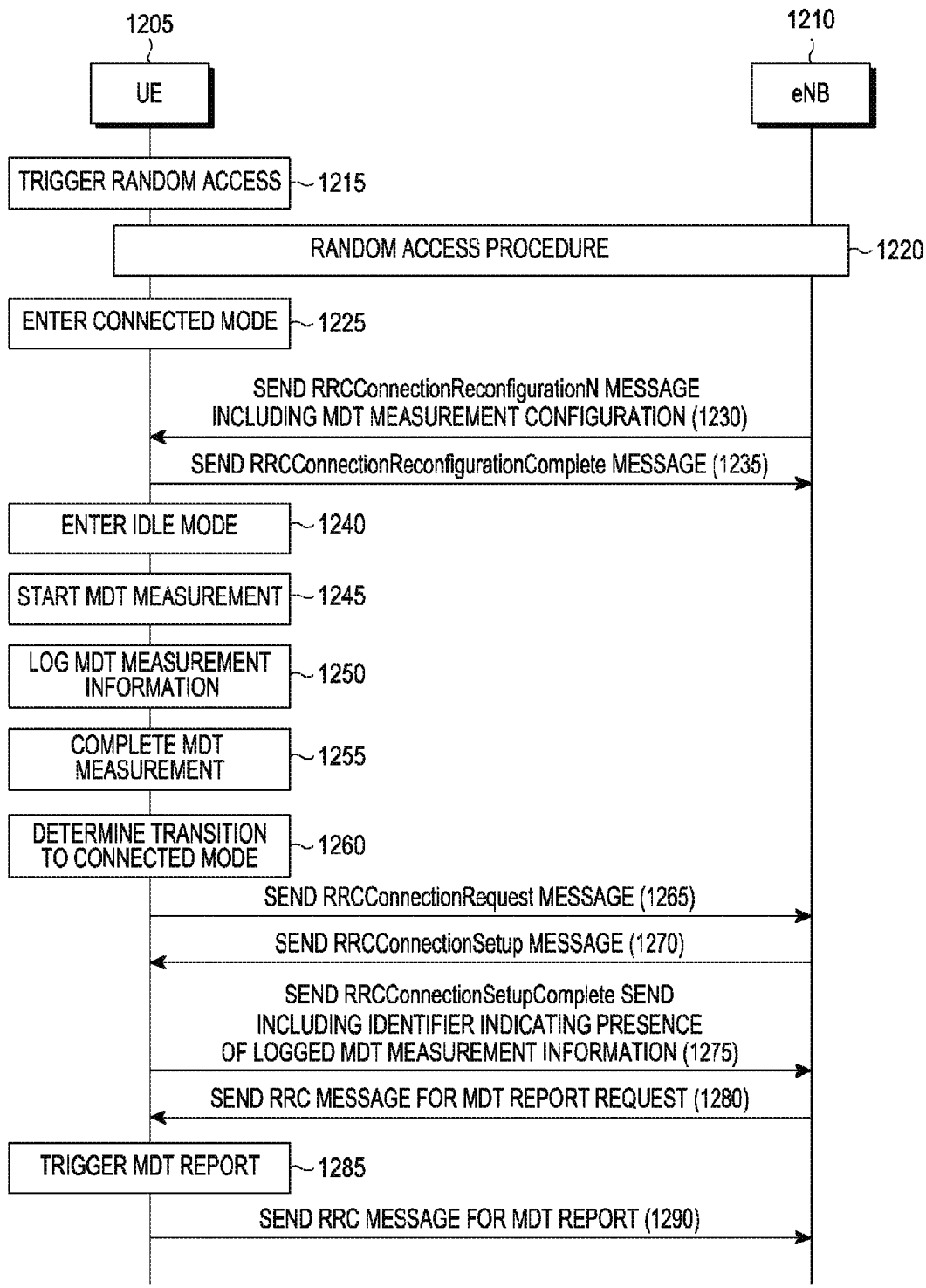
FIG. 12 shows a general process of reporting logged MDT measurement information to an eNB by a UE upon request of the eNB.

FIG. 12 shows a general process of reporting logged MDT measurement information to an eNB by a UE upon request of the eNB.

A UE 1205 triggers an access attempt for communication with an eNB 1210 in step 1215, and attempts a random access to the eNB 1210 in step 1220. Thereafter, the UE 1205 enters the connected mode in step 1225. Then, in step 1230, the eNB 1210 delivers information necessary for MDT execution, i.e., MDT measurement configuration information to the UE 1205, using an RRCConnectionReconfiguration message. The MDT measurement configuration information includes MDT measurement execution period, information about the frequency and cell to be measured, information about logging and reporting, MDT execution area, and the like.

In step 1235, the UE 1205 sends an RRCConnectionReconfigurationComplete message to the eNB 1210 as a response message to the RRCConnectionReconfiguration message. Thereafter, if the UE 1205 transitions to the idle mode and the MDT measurement execution period begins in step 1240, the UE 1205 performs MDT measurement in step 1245. For reference, the MDT measurement configuration information may also be delivered using an RRCConnectionRelease message that the eNB 1210 sends to the UE 1205 before the UE 1205 terminates the RRC connection. In other words, the MDT measurement configuration information may be transmitted to the UE 1205 either when the RRC connection between the eNB 1210 and the UE 1205 is maintained, or when the RRC connection is released.

The UE 1205 logs the measurement information in step 1250, if it meets the logging criterion during MDT measurement. The UE 1205 stops or completes the MDT measurement in step 1255, if the indicated execution period expires.

Thereafter, the UE 1205 determines its transition to the connected mode in step 1260, and sends an RRCConnectionRequest message to the eNB 1210 in step 1265. When accepting the request, the eNB 1210 sends an RRCConnectionSetup message to the UE 1205 in step 1270.

Thereafter, having transitioned to the connected mode, the UE 1205 may deliver the MDT measurement information it logged in the idle mode, to the eNB 1210. Before the delivery, in step 1275, the UE 1205 checks whether there is any MDT measurement information it logged, and if so, sends an RRCConnectionSetupComplete message including an identifier indicating the presence of the logged MDT measurement information. The RRCConnectionSetupComplete message may include a 1-bit identifier, and may also include additional information that helps the eNB make a request decision, as follows.

(1) The amount of data for logged measurement information (2) The logged MDT measurement type (e.g., random access failure, etc.)

(3) The time elapsed after logging (4) MDT configuration information that a UE applied during MDT measurement (5) Others This additional information allows the eNB to efficiently use the limited radio resources. For example, if the UE 1205 stays in the idle mode for a long time, a lot of MDT measurement information will be logged. At this time, if transitioning to the connected mode, if the UE 1205 needs to consume a lot of resources for transmission of the logged information. In order to solve these problems, the eNB 1210 checks and requests the necessary information in advance.

If the eNB 1210 determines that the MDT measurement information logged by the UE 1205 is useful based on the RRCConnectionSetupComplete message received from the UE 1205, the eNB 1210 requests MDT measurement information from the UE 1205 using one information request message in step 1280. In response, the UE 1205 triggers MDT measurement information reporting in step 1285. The information request message, an RRC message for MDT report request, corresponds to an SRB2. In step 1290, the UE 1205 delivers the MDT measurement information to the eNB 1210 using an information response message. The information response message is also an RRC message for MDT report, which corresponds to an SRB2. The SRB2 is reliably transmitted by a retransmission technique such as ARQ in an RLC layer and HARQ in a MAC layer. However, in the handover process, the SRB2 cannot get the help of these retransmission techniques, and the transmission process in the PDCP layer 430 is also not applied. In other words, during the handover process, the PDCP layer 430 stores PDCP SDUs in the buffer unless it receives an ACK from the lower layer (i.e., the RLC layer 465), and after the handover, retransmits the PDCP SDUs stored in the buffer to a target eNB. Thus, the packet loss does not occur. However, the PDCP layer connected to the SRB2 discards all the stored data if a handover occurs, so all of the RRC messages are lost, transmission of which is not completed before the handover occurs. Therefore, a loss of RRC messages may occur during a handover, and if MDT measurement results are included in the lost RRC messages, the MDT measurement results will also be lost. The present invention provides a method and apparatus for reliably delivering MDT measurement results even though a handover occurs, in delivering the MDT measurement results using an RRC message.

Third Embodiment

Figure 13:
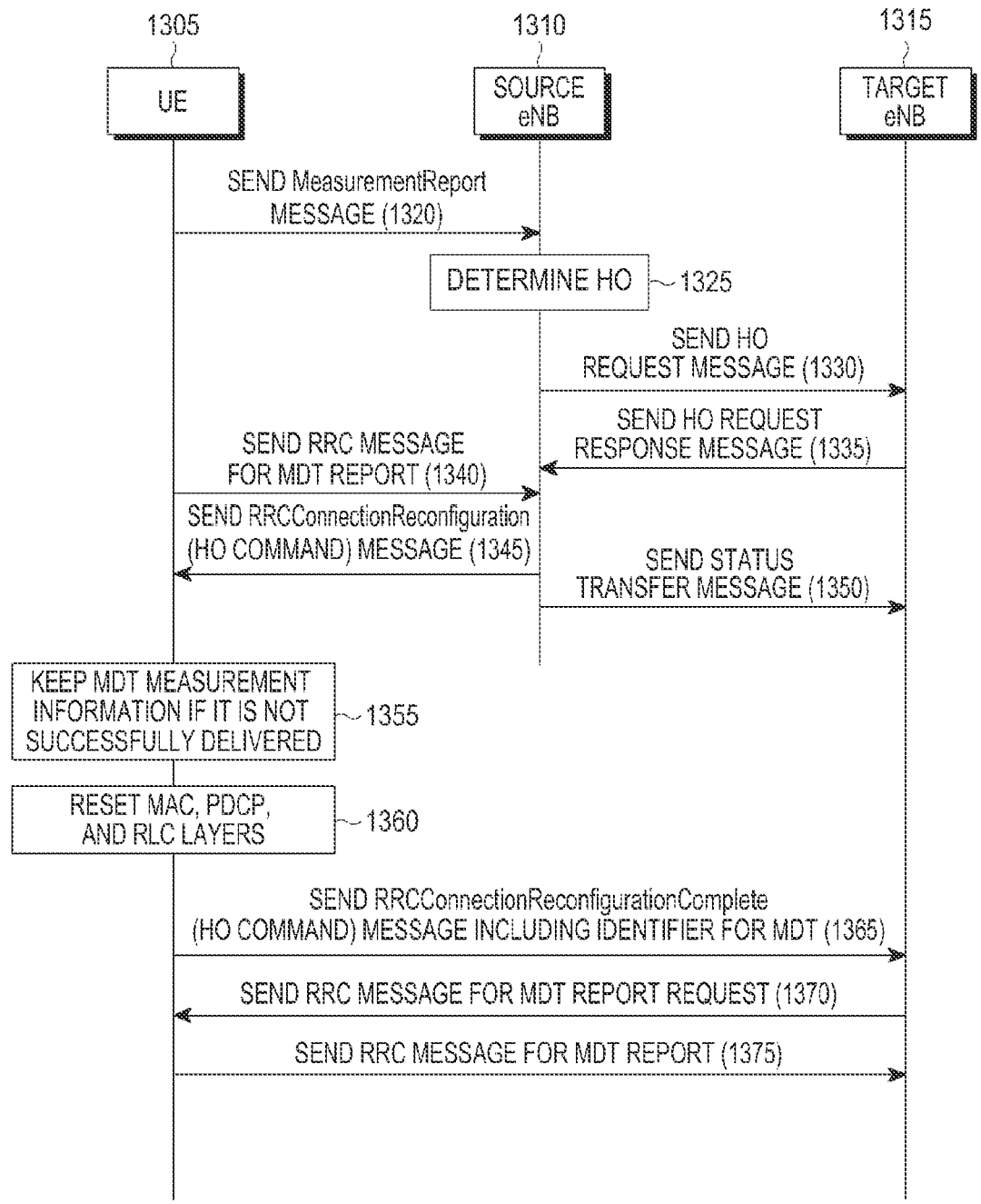
FIG. 13 shows a method of delivering MDT measurement information during a handover according to a third embodiment of the present invention.

FIG. 13 shows a method of delivering MDT measurement information during a handover according to a third embodiment of the present invention.

In this scenario, a UE 1305 performs a handover from a source eNB 1310 to a target eNB 1315. In step 1320, the UE 1305 reports MDT measurement information to the source eNB 1310 using a MeasurementReport message. In step 1325, the source eNB 1310 determines whether the UE 1305 needs to perform a handover, based on the MDT measurement information transmitted from the UE 1305. The source eNB 1310 sends a HO request message to the target eNB 1315 in step 1330, in order to request a handover, and in response, the target eNB 1315 sends a response message to the HO request message in step 1335. In step 1340, the UE 1305 starts sending an RRC message for MDT report to the source eNB 1310 in order to report the MDT measurement information. While the MDT measurement information is transmitted, the source eNB 1310 sends a handover command message (or RRCConnectionReconfiguration message) to the UE 1302 for an instruction to perform a handover, in step 1345. At the same time, the source eNB 1310 delivers information necessary for a handover such as PDSCH Sequence Number (SN) and Hyper Frame Number (HFN) to the target eNB 1315 using a STATUS TRANSFER message, in step 1350. An RRC layer of the UE 1305 may determine whether the entire RRC message including MDT measurement information has been successfully transmitted, based on the report from the lower layer. Upon receiving information indicating that the RRC message has not been successfully transmitted, the RRC layer of the UE 1305 stores the MDT measurement information in the buffer in step 1355. In accordance with the handover procedure, the UE 1305 resets MAC, RLC and PDCP layers in step 1360. If the handover is completed, the UE 1305 informs the target eNB 1315 of the presence of MDT measurement information to report, using an RRCConnectionReconfigurationComplete message in step 1365. In other words, the UE 1305 sends an RRCConnectionReconfiguration- Complete message including an identifier for MDT to the target eNB 1315. If the target eNB 1315 requests a report for MDT measurement information from the UE 1305 using an RRC message for MDT report request in step 1370, the RRC layer of the UE 1305 retransmits the stored MDT measurement information using an RRC message for MDT report in step 1375.

Figure 14:
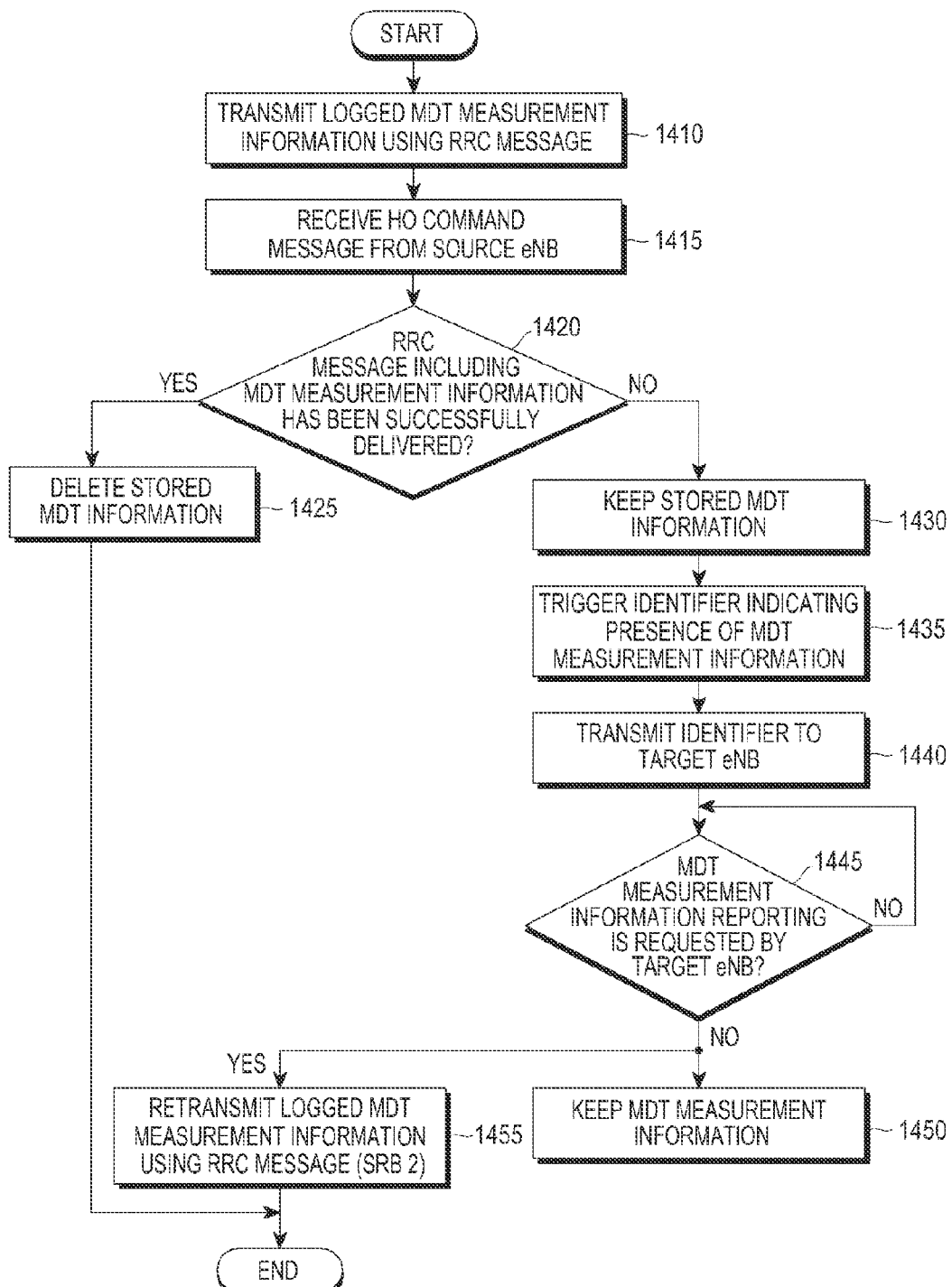
FIG. 14 shows an operation of a UE during a handover according to the third embodiment of the present invention.

FIG. 14 shows an operation of a UE during a handover according to the third embodiment of the present invention.

In step 1410, the UE starts sending logged MDT measurement information to an eNB using one RRC message corresponding to an SRB2. During the transmission, upon receiving a handover execution command from the source eNB in step 1415, the UE determines in step 1420 whether a PDCP SDU of an RRC message including the MDT measurement information has been successfully delivered. If the PDCP SDU of the RRC message has been successfully delivered, the RRC layer of the UE deletes all the stored MDT measurement information in step 1425. However, if the PDCP SDU has not been successfully delivered, the RRC layer of the UE keeps the MDT measurement information in step 1430. If the handover is completed, the RRC layer of the UE triggers an identifier indicating the presence of MDT measurement information in step 1435, and sends an RRCConnectionReconfigurationComplete message including an identifier indicating the presence of MDT measurement information in the UE to the target eNB in step 1440. The UE checks in step 1445 whether the target eNB requests MDT measurement information reporting. If there is a request from the eNB in step 1445, the UE retransmits the MDT measurement information stored in the buffer of the RRC layer in step 1455. However, if there is no request from the eNB in step 1445, the UE maintains the MDT measurement information in step 1450, waiting until there is a request from the eNB.

Fourth Embodiment

Figure 15:
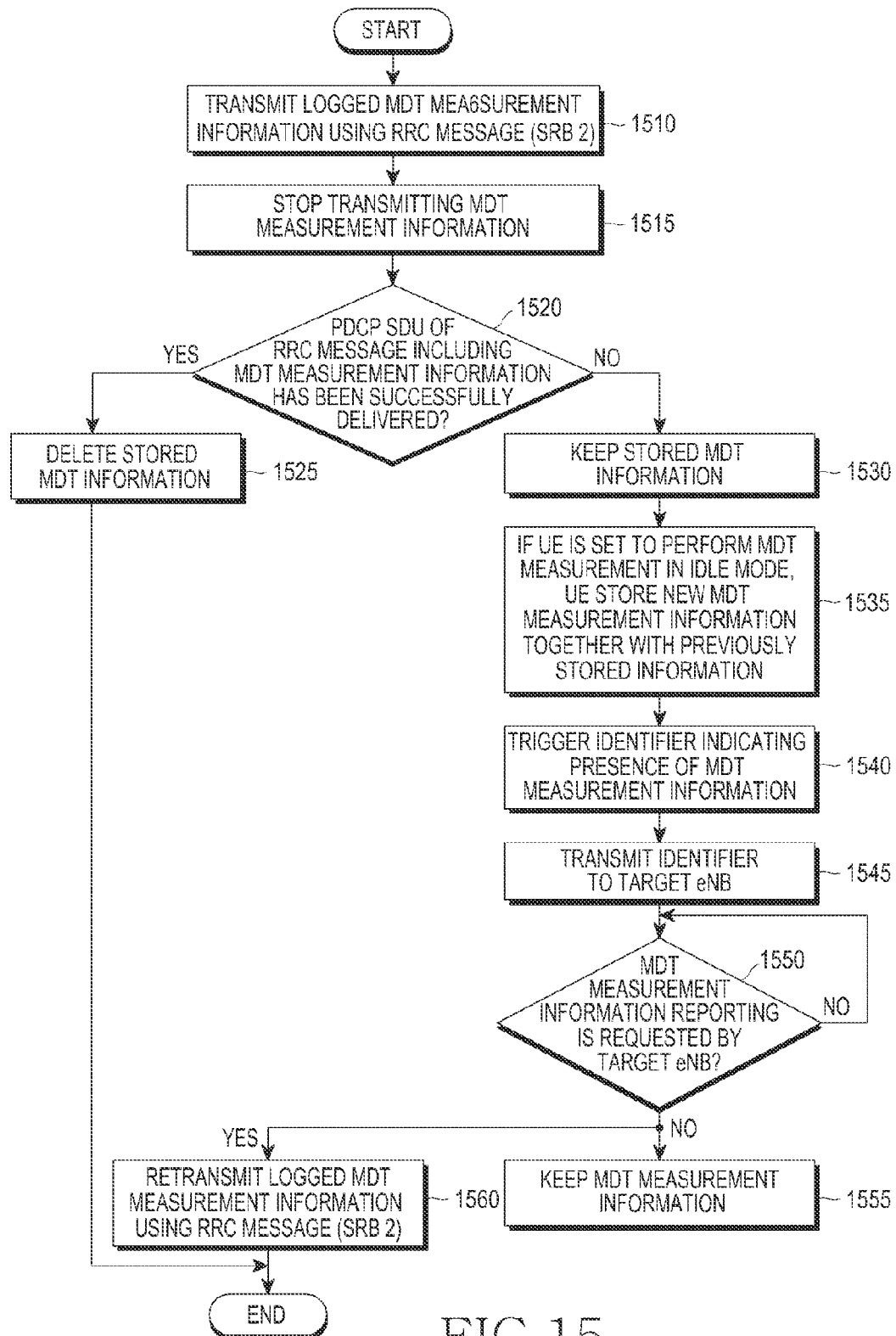
FIG. 15 shows an operation of a UE when transmission of MDT measurement information is stopped, according to a fourth embodiment of the present invention.

FIG. 15 shows an operation of a UE when transmission of MDT measurement information is stopped, according to a fourth embodiment of the present invention.

In step 1510, the UE starts sending logged MDT measurement information to an eNB using one RRC message corresponding to an SRB2. During the transmission, the transmission of the MDT measurement information may be stopped in the UE for some reasons in step 1515. For example, if the UE suddenly moves to a shaded area, the UE needs to stop the transmission of the MDT measurement information. In this case, the UE determines in step 1520 whether a PDCP SDU of an RRC message including the MDT measurement information has been successfully delivered. If the PDCP SDU of the RRC message has been successfully delivered, the UE deletes all the stored MDT measurement information in step 1525. However, if the PDCP SDU of the RRC message has not been successfully delivered, the RRC layer of the UE maintains the MDT measurement information in step 1530. Thereafter, in step 1535, if the UE is set to perform MDT in the idle mode, the UE performs MDT and stores new measurement information together with the previously stored information. In step 1540, if the connection is recovered, the RRC layer of the UE triggers an identifier indicating the presence of MDT measurement information. In step 1545, the UE delivers to a target eNB an RRCConnectionReconfigurationComplete message including an identifier indicating the presence of MDT measurement information. Thereafter, the UE checks in step 1550 whether the target eNB requests MDT measurement information reporting. If there is a request from the eNB in step 1550, the UE retransmits the MDT measurement information stored in the buffer in step 1560. However, if there is no request from the eNB in step 1550, the UE maintains the MDT measurement information in step 1555, waiting until there is a request from the eNB.

Figure 16:
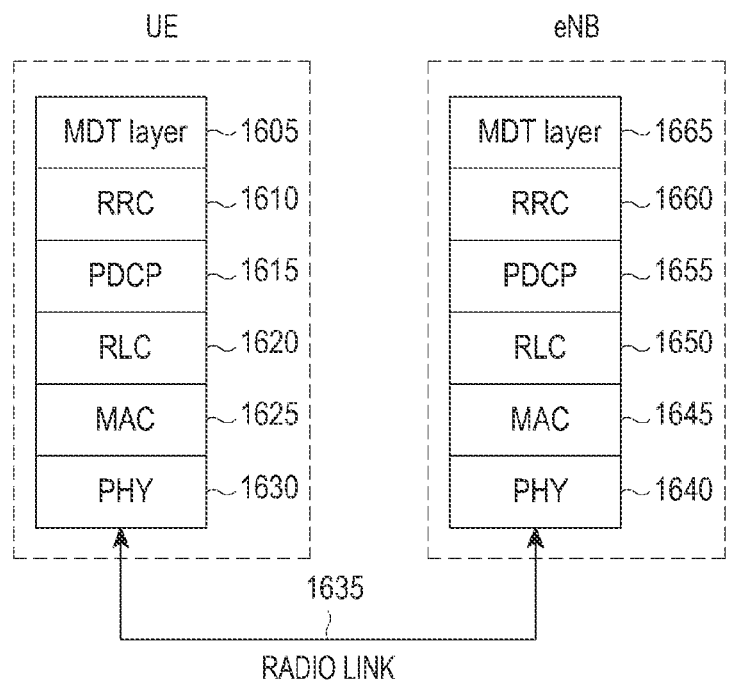
FIG. 16 shows a structure of a control plane protocol including an MDT layer.

FIG. 16 shows a structure of a control plane protocol including an MDT layer.

A function of an RRC layer 1610, described below with reference to FIG. 16, may also be performed in a separately constructed MDT layer 1605. The MDT layer 1605 needs to receive a report indicating whether MDT measurement information transmitted from a lower layer has been successfully delivered. The MDT layer 1605 also needs a buffer that can store MDT measurement information. The existing layers do not need big changes because the MDT layer 1605 is responsible for MDT measurement information and retransmission thereof.

Figure 17:
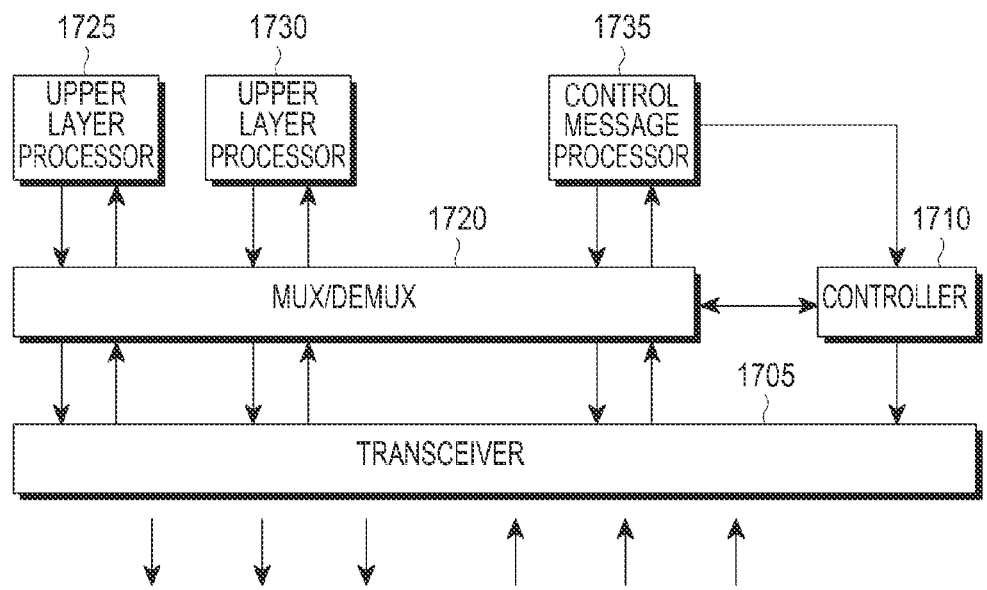
FIG. 17 shows a structure of a UE according to an embodiment of the present invention.

FIG. 17 shows a structure of a UE according to an embodiment of the present invention.

The UE apparatus includes a transceiver 1705, a controller 1710, a multiplexing and demultiplexing (MUX/DEMUX) device 1720, a control message processor 1735, and various upper layer processors 1725 and 1730.

The transceiver 1705 transmits MDT measurement information to the service eNB and receives a handover command message from the source eNB, using an RRC message.

The control message processor 1735 performs an operation that the UE needs according to embodiments of the present invention, by analyzing the RRC message received from the eNB. Upon receiving the RRC message, the control message processor 1735 delivers it to the controller 1710.

The controller 1710 maintains stored MDT measurement information if it has failed to successfully receive an RRC message including the MDT measurement information, and sends a message including an identifier indicating the presence of the MDT measurement information to the target eNB if the handover is completed. Upon receiving an RRC message for requesting the MDT measurement information from the target eNB, the controller 1710 sends an RRC message including the stored MDT measurement information to the target eNB.

The multiplexing and demultiplexing device 1720 multiplexes the data generated in the upper layer processors 1725 and 1730 and the control message processor 1735, or the multiplexing and demultiplexing device 1720 demultiplexes the data received from the transceiver 1705 and delivers the demultiplexed data to the proper upper layer processors 1725 and 1730 or the control message processor 1735.

The upper layer processors 1725 and 1730, which may be constructed individually for each service, process the data generated in user services such as File Transfer Protocol (FTP) and Voice over Internet Protocol (VoIP), and deliver the processed data to the multiplexing device, or the upper layer processors 1725 and 1730 process the data delivered from the demultiplexing device, and deliver the processed data to service applications in an upper layer.

The invention claimed is:
1. A method for transmitting channel measurement results by a user equipment (UE) in a mobile communication system, comprising:
 receiving, by a receiver, information for channel measurement from a serving evolved node B (eNB);
 measuring, by a controller, a channel based on the received information and generating channel measurement-related information; and
 transmitting, by a transmitter, the channel measurement-related information to the serving eNB or at least one of neighboring eNBs based on a handover, wherein the channel measurement-related information includes minimization of drive test (MDT) measurement information.

2. The method of claim 1, wherein the receiver further comprises one of receiving a unique identifier of a cell from the serving eNB and receiving a physical cell identifier from a neighboring eNB.

3. The method of claim 1, wherein the information for channel measurement includes at least one of frequency band information and closed subscriber group (CSG) eNB information,
wherein the frequency band information includes information about a frequency band in which the UE measures a signal, and
wherein the CSG eNB information includes information indicating whether to include a CSG eNB in the channel measurement-related information during generation of the channel measurement-related information.

4. The method of claim 3, wherein the controller selects an eNB, a channel to which is to be measured based on the information for channel measurement, generates channel measurement-related information for the selected eNB, and determines final channel measurement-related information from the channel measurement-related information by applying the CSG eNB information, and
wherein the transmitter reports the final channel measurement-related information to the serving eNB or at least one of the neighboring eNBs.

5. The method of claim 4, wherein the controller,
determines whether to include a CSG eNB, using the CSG eNB information;
when determining to include the CSG eNB, determines whether it is possible to identify a unique identifier of a cell of the CSG eNB; and
if it is possible to identify a unique identifier of a cell of the CSG eNB, selects a predetermined number of strongest signals from the measured eNB signals, and includes the selected signals in the final channel measurement-related information.

6. The method of claim 5, wherein if it is not possible to identify a unique identifier of a cell of the CSG eNB, the controller selects a predetermined number of strongest signals from the measured eNB signals, excluding a CSG eNB, a unique identifier of a cell of which cannot be identified, from the final channel measurement-related information, and includes the selected signals in the final channel measurement-related information.

7. The method of claim 4, wherein the receiver of the UE receives an indicator indicating whether confusion of a physical cell identifier of the CSG eNBs has occurred; and
wherein the controller determines whether to include the CSG eNBs in the final channel measurement-related information, based on the indicator.

8. The method of claim 1, wherein the information for channel measurement includes at least one of a channel measurement execution period, information about frequency and cell to be measured, information about logging and reporting, and a channel measurement area.

9. The method of claim 1, wherein the receiver receives a handover command message from a source eNB; and
wherein the controller determines whether a radio resource control (RRC) message including the channel measurement-related information has been successfully transmitted, and deletes the channel measurement-related information if the RRC message has been successfully transmitted.

10. The method of claim 9, wherein if the RRC message has not been successfully transmitted, the controller keeps the channel measurement-related information, and if a handover is completed, the controller triggers an identifier, sends an RRC message including the identifier to a target eNB from the UE, and determines whether the target eNB requests the channel measurement-related information; and
wherein if the target eNB requests the channel measurement-related information, the transmitter retransmits the channel measurement-related information using an RRC message.

11. The method of claim 10, wherein if the target eNB does not request the channel measurement-related information, the transmitter keeps the channel measurement-related information.

12. The method of claim 11, wherein the controller determines whether the RRC message including the channel measurement-related information has been successfully transmitted, based on information about a report from a lower layer.

13. The method of claim 1, wherein the channel measurement-related information includes a fingerprint value.

14. The method of claim 1, wherein the channel measurement-related information includes a fingerprint value.

15. An apparatus for transmitting channel measurement results by a user equipment (UE) in a mobile communication system, comprising:
a receiver for receiving information for channel measurement from a serving evolved node B (eNB);
a controller for measuring a channel based on the received information and generating channel measurement-related information; and
a transmitter for transmitting the channel measurement-related information to the serving eNB or at least one of neighboring eNBs based on a handover,
wherein the channel measurement-related information includes minimization of drive test (MDT) measurement information.

16. The apparatus of claim 15, wherein the receiver further comprises one of receiving a unique identifier of a cell from the serving eNB and receiving a physical cell identifier from a neighboring eNB.

17. The apparatus of claim 15, wherein the information for channel measurement includes at least one of frequency band information and closed subscriber group (CSG) eNB information,
wherein the frequency band information includes information about a frequency band in which the UE measures a signal, and
wherein the CSG eNB information includes information indicating whether to include a CSG eNB in the channel measurement-related information during generation of the channel measurement-related information.

18. The apparatus of claim 17, wherein the controller selects an eNB, a channel to which is to be measured based on the information for channel measurement, generates channel measurement-related information for the selected eNB, and determines final channel measurement-related information from the channel measurement-related information by applying the CSG eNB information, and
wherein the transmitter reports the final channel measurement-related information to the serving eNB or at least one of the neighboring eNBs.

19. The apparatus of claim 18, wherein the controller,
determines whether to include a CSG eNB, using the CSG eNB information;

when determining to include the CSG eNB, determines whether it is possible to identify a unique identifier of a cell of the CSG eNB; and if it is possible to identify a unique identifier of a cell of the CSG eNB, selects a predetermined number of strongest signals from the measured eNB signals, and includes the selected signals in the final channel measurement-related information.

20. The apparatus of claim 19, wherein if it is not possible to identify a unique identifier of a cell of the CSG eNB, the controller selects a predetermined number of strongest signals from the measured eNB signals, excluding a CSG eNB, a unique identifier of a cell of which cannot be identified, from the final channel measurement-related information, and includes the selected signals in the final channel measurement-related information.

21. The apparatus of claim 18, wherein the receiver of the UE receives an indicator indicating whether confusion of a physical cell identifier of the CSG eNBs has occurred; and wherein the controller determines whether to include the CSG eNBs in the final channel measurement-related information, based on the indicator.

22. The apparatus of claim 15, wherein the information for channel measurement includes at least one of a channel measurement execution period, information about frequency and cell to be measured, information about logging and reporting, and a channel measurement area.

23. The apparatus of claim 22, wherein if the RRC message has not been successfully transmitted, the controller keeps the channel measurement-related information, and if a handover is completed, the controller triggers an identifier, sends an RRC message including the identifier to a target eNB from the UE, and determines whether the target eNB requests the channel measurement-related information; and wherein if the target eNB requests the channel measurement-related information, the transmitter retransmits the channel measurement-related information using an RRC message.

24. The apparatus of claim 23, wherein the controller determines whether the RRC message including the channel measurement-related information has been successfully transmitted, based on information about a report from a lower layer.

25. The apparatus of claim 15, wherein the receiver receives a handover command message from a source eNB; and wherein the controller determines whether a radio resource control (RRC) message including the channel measurement-related information has been successfully transmitted, and deletes the channel measurement-related information if the RRC message has been successfully transmitted.

26. The apparatus of claim 25, wherein if the target eNB does not request the channel measurement-related information, the transmitter keeps the channel measurement-related information.

27. The apparatus of claim 15, wherein the channel measurement-related information includes a fingerprint value.

28. A method for transmitting channel measurement results by a User Equipment (UE) in a mobile communication system, comprising:

receiving information for channel measurement from a serving evolved node B (eNB);

selecting at least one neighboring eNB to be included in channel measurement by the UE, using the received information;

measuring a signal from the selected at least one neighboring eNB;

selecting, by a controller, a signal from the eNB to be included in channel measurement by the UE based on the measured signal from the at least one neighboring eNB;

generating channel-related information of the UE using the selected signal from the eNB; and transmitting the generated channel-related information of the UE to one of the at least one neighboring eNB or the serving eNB based on a handover, wherein the channel measurement-related information includes minimization of drive test (MDT) measurement information.

29. The method of claim 28, wherein the receiver further receives one of a unique identifier of a cell from the serving eNB and a physical cell identifier from the neighboring eNB.

30. The method of claim 28, wherein the information for channel measurement includes at least one of frequency band information and closed subscriber group (CSG) eNB information, wherein the frequency band information includes information about a frequency band in which the UE measures a signal, and wherein the CSG eNB information includes information indicating whether to include an CSG eNB during generation of channel measurement-related information.

31. The method of claim 30, wherein the controller further:

determines whether to include a CSG eNB, using the CSG eNB information;

when determining to include the CSG eNB, determines whether it is possible to identify a unique identifier of a cell of the CSG eNB; and if it is possible to identify a unique identifier of a cell of the CSG eNB, selects a predetermined number of strongest signals from the measured eNB signals, and includes the selected signals in the final channel measurement-related information.

32. The method of claim 31, wherein if it is not possible to identify a unique identifier of a cell of the CSG eNB, the controller selects a predetermined number of strongest signals from the measured eNB signals, excluding a CSG eNB, a unique identifier of a cell of which cannot be identified, from the final channel measurement-related information, and includes the selected signals in the final channel measurement-related information.

33. The method of claim 28, wherein the controller selects an eNB, a channel to which is to be measured based on the information for channel measurement, generates channel measurement-related information for the selected eNB, and generates final channel measurement-related information from the channel measurement-related information by applying the CSG eNB information, and wherein the transmitter reports the final channel measurement-related information to the serving eNB or at least one of the neighboring eNBs.

34. The method of claim 33, wherein the receiver receives an indicator indicating whether confusion of a physical cell identifier of the CSG eNBs has occurred; and wherein the controller determines whether to include the CSG eNBs in the final channel measurement-related information, based on the indicator.

35. The method of claim 28, wherein the channel measurement-related information includes a fingerprint value.

36. An apparatus for transmitting channel measurement results by a user equipment (UE) in a mobile communication system, comprising:

a receiver for receiving information for channel measurement from a serving evolved node B (eNB);

a controller for selecting at least one neighboring eNB to be included in channel measurement by the UE, using the received information, measuring a signal from the selected at least one neighboring eNB, selecting a signal from the eNB to be included in channel measurement by the UE based on the measured signal from the at least one neighboring eNB, and generating channel-related information of the UE using the selected signal from the eNB; and a transmitter for transmitting the generated channel-related information of the UE to one of the at least one neighboring eNB or the serving eNB based on a handover, wherein the channel measurement-related information includes minimization of drive test (MDT) measurement information.

37. The apparatus of claim 36, wherein the receiver further receives one of a unique identifier of a cell from the serving eNB and a physical cell identifier from the neighboring eNB.

38. The apparatus of claim 36, wherein the information for channel measurement includes at least one of frequency band information and closed subscriber group (CSG) eNB information, wherein the frequency band information includes information about a frequency band in which the UE measures a signal, and wherein the CSG eNB information includes information indicating whether to include an CSG eNB during generation of channel measurement-related information.

39. The apparatus of claim 38, wherein the controller further:

determines whether to include a CSG eNB, using the CSG eNB information;

when determining to include the CSG eNB, determines whether it is possible to identify a unique identifier of a cell of the CSG eNB; and if it is possible to identify a unique identifier of a cell of the CSG eNB, selects a predetermined number of strongest signals from the measured eNB signals, and includes the selected signals in the final channel measurement-related information.

40. The apparatus of claim 39, wherein if it is not possible to identify a unique identifier of a cell of the CSG eNB, the controller selects a predetermined number of strongest signals from the measured eNB signals, excluding a CSG eNB, a unique identifier of a cell of which cannot be identified, from the final channel measurement-related information, and includes the selected signals in the final channel measurement-related information.

41. The apparatus of claim 36, wherein the controller selects an eNB, a channel to which is to be measured based on the information for channel measurement, generates channel measurement-related information for the selected eNB, and generates final channel measurement-related information from the channel measurement-related information by applying the CSG eNB information, and wherein the transmitter reports the final channel measurement-related information to the serving eNB or at least one of the neighboring eNBs.

42. The apparatus of claim 41, wherein the receiver receives an indicator indicating whether confusion of a physical cell identifier of the CSG eNBs has occurred; and wherein the controller determines whether to include the CSG eNBs in the final channel measurement-related information, based on the indicator.

43. The apparatus of claim 36, wherein the channel measurement-related information includes a fingerprint value.

44. A method for transmitting channel measurement results by a user equipment (UE) in a mobile communication system, comprising:

receiving information for channel measurement from a serving evolved node B (eNB);

generating and storing channel measurement-related information by measuring a channel from the serving eNB or at least one of neighboring eNBs, using the received information;

sending a radio resource control (RRC) message including the channel measurement-related information to a source eNB;

receiving a handover command message from the source eNB; and determining, by a controller, whether to keep or delete the channel measurement-related information depending on whether the RRC message including the channel measurement-related information has been successfully transmitted.

45. The method of claim 44, wherein the controller determines whether the RRC message including the channel measurement-related information has been successfully transmitted, based on information about a report from a lower layer.

46. The method of claim 44, wherein if the RRC message including the channel measurement-related information has been successfully transmitted, the controller deletes the stored channel measurement-related information.

47. The method of claim 44, wherein if the RRC message including the channel measurement-related information has not been successfully transmitted, the controller keeps the stored channel measurement-related information.

48. The method of claim 44, wherein the channel measurement-related information includes a fingerprint value.

49. An apparatus for transmitting channel measurement results by a user equipment (UE) in a mobile communication system, comprising:

a receiver for receiving information for channel measurement from a serving evolved node B (eNB), and receiving a handover command message from the serving eNB;

a controller for generating and storing channel measurement-related information by measuring a channel from the serving eNB or at least one of neighboring eNBs, using the received information; and a transmitter for sending a radio resource control (RRC) message including the channel measurement-related information;

wherein if the UE is handed over, the controller determines whether to keep or delete the channel measurement-related information depending on whether the RRC message including the channel measurement-related information has been successfully transmitted.

50. The apparatus of claim 49, wherein the controller determines whether the RRC message including the channel measurement-related information has been successfully transmitted, based on information about a report from a lower layer.

51. The apparatus of claim 49, wherein if the RRC message including the channel measurement-related information has been successfully transmitted, the controller deletes the stored channel measurement-related information.

52. The apparatus of claim 49, wherein if the RRC message including the channel measurement-related information has not been successfully transmitted, the controller keeps the stored channel measurement-related information.

53. The apparatus of claim 49, wherein the channel measurement-related information includes a fingerprint value.

* * * * *